United States Patent
Sancho Díaz et al.

(10) Patent No.: US 11,047,019 B2
(45) Date of Patent: Jun. 29, 2021

(54) METHOD AND APPARATUS FOR HEAT TREATMENT OF A FERROUS MATERIAL USING AN ENERGY BEAM

(71) Applicant: IKERGUNE, A.I.E., Elgoibar (ES)

(72) Inventors: Paula Sancho Díaz, Elgoibar (ES); Irati Iglesias Valle, Elgoibar (ES); Jesús Domínguez Cobreros, Elgoibar (ES)

(73) Assignee: IKERGUNE, A.I.E, Elgoibar (ES)

( * ) Notice: Subject to any disclaimer, the term of this patent is extended or adjusted under 35 U.S.C. 154(b) by 272 days.

(21) Appl. No.: 15/572,730

(22) PCT Filed: May 6, 2016

(86) PCT No.: PCT/EP2016/060226
§ 371 (c)(1),
(2) Date: Nov. 8, 2017

(87) PCT Pub. No.: WO2016/180736
PCT Pub. Date: Nov. 17, 2016

(65) Prior Publication Data
US 2018/0155804 A1  Jun. 7, 2018

(30) Foreign Application Priority Data
May 8, 2015 (EP) .................................. 15382242

(51) Int. Cl.
*C21D 9/30* (2006.01)
*C21D 1/09* (2006.01)
*B23K 26/082* (2014.01)

(52) U.S. Cl.
CPC .............. *C21D 9/30* (2013.01); *B23K 26/082* (2015.10); *C21D 1/09* (2013.01); *C21D 2221/00* (2013.01)

(58) Field of Classification Search
CPC .. B23K 26/08; B23K 26/082; B23K 26/0821; B23K 26/083; B23K 26/0869; B23K 26/0892; C21D 9/30; C21D 1/09
(Continued)

(56) References Cited

U.S. PATENT DOCUMENTS 5,587,094 A * 12/1996 Yoshida .................. B23K 26/08
                                               219/121.68
5,760,943 A *  6/1998 Kim ....................... B23K 26/06
                                               347/260
(Continued)

FOREIGN PATENT DOCUMENTS

CN    103215411 A    7/2013
DE      256274 A1    5/1988
(Continued)

OTHER PUBLICATIONS

CN Office Action dated Dec. 3, 2018 re: Application No. 201680037506.7, pp. 1-15, citing: WO2014037281A1, JPS637327A, DE102010048645A1, CN103215411A.
(Continued)

*Primary Examiner* — Justin C Dodson
(74) *Attorney, Agent, or Firm* — Cantor Colburn LLP

(57) ABSTRACT

A method and apparatus for heat treatment of an object, such as for hardening of objects with complex shapes such as crankshafts, includes the steps of projecting an energy beam such as a laser beam onto a surface of the object, operating a scanner so as to repetitively scan the beam to displace a primary spot in accordance with a first scanning pattern so as to establish an effective spot on the object, and displacing the effective spot in relation to the surface of the object. The beam follows an optical path between the scanner and the surface of the object. A beam deflector device is placed in the
(Continued)

optical path to redirect the beam. The beam deflector device can be placed close to the surface of the object.

13 Claims, 16 Drawing Sheets

(58) Field of Classification Search
USPC .............. 219/121.6, 121.61, 121.63–121.66, 219/121.78–121.81, 121.85
See application file for complete search history.

(56) References Cited

U.S. PATENT DOCUMENTS

| | | | |
|---|---|---|---|
| 5,984,159 A * | 11/1999 | Ostendarp | B23K 26/073 225/93.5 |
| 2005/0237895 A1* | 10/2005 | Tanaka | B23K 26/0738 369/97 |
| 2009/0118716 A1 | 5/2009 | Brownell | |
| 2014/0183174 A1* | 7/2014 | Yoon | C21D 9/30 219/121.78 |
| 2014/0261283 A1 | 9/2014 | Lineton et al. | |
| 2016/0076115 A1 | 3/2016 | Zeng et al. | |

FOREIGN PATENT DOCUMENTS

| | | |
|---|---|---|
| DE | 256275 A1 | 5/1988 |
| DE | 3905551 A1 | 8/1990 |
| DE | 4123577 A1 | 1/1993 |
| DE | 4242540 A1 | 6/1994 |
| DE | 202005005905 U1 | 6/2005 |
| DE | 102009034472 A1 | 2/2011 |
| DE | 102010048645 A1 | 4/2012 |
| JP | 5976816 A | 5/1984 |
| JP | 61227132 A | 10/1986 |
| JP | 627821 A | 1/1987 |
| JP | S637327 A | 1/1988 |
| WO | 2005053896 A1 | 6/2005 |
| WO | 2006024465 A1 | 3/2006 |
| WO | 2006114445 A1 | 11/2006 |
| WO | 2014201788 A1 | 2/2014 |
| WO | 2014037281 A2 | 3/2014 |
| WO | 2016180736 A1 | 11/2016 |

OTHER PUBLICATIONS

EP Examination Report dated Nov. 9, 2018 re: Application No. 16 722 625.7-1108, pp. 1-4, citing: DE 10 2010 048645 A1.
C. Daniel et al. "Periodical micro-nano-structuring of metallic surfaces by interfering laser beams", Applied Surface Science, Mar. 15, 2003, vol. 208-209, pp. 317-321 XP002435597.
F. Mucklich et al. "Laser Interference Metallurgy-Periodic Surface Patterning and Formation of Intermetallics", Intermetallics, Mar. 1, 2005, vol. 13, No. 3-4, pp. 437-442 XP027617151.
International Preliminary Report on Patentability dated Aug. 7, 2017 re: Application No. PCT/EP2016/060226; pp. 1-27; citing: US 2005/237895 A1, DE 41 23 577 A1, F. Mucklich et al. "Laser interference. . . " and C. Daniel et al. "Periodical micro-nano-structuring . . . ".
International Search Report dated Jul. 13, 2016 re: Application No. PCT/EP2016/060226; pp. 1-4; citing: US 2005/237895 A1, DE 41 23 577 A1, WO 2014/037281 A2, DE 10 2010 048645 A1, DE 42 42 540 A1 and US 2009/118716 A1.
Written Opinion dated Jul. 13, 2016 re: Application No. PCT/EP2016/060226; pp. 1-5; citing: US 2005/237895 A1 and DE 41 23 577 A1.
Fritz Klocke et al. "Flexible scanner-based laser surface treatment", ScienceDirect Physics Procedia, 2010, vol. 5, pp. 467-475.
M. Seifert et al. "High Power Diode Laser Beam Scanning in Multi-Kilowatt Range", Proceedings of the 23rd International Congress on Applications of Lasers and Electro-Optics, 2004, pp. 1-6.

* cited by examiner

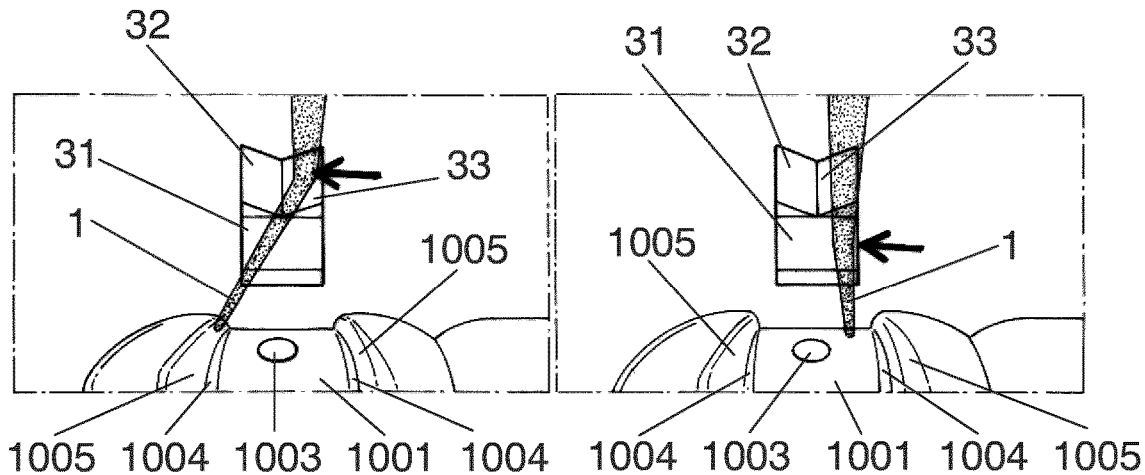
FIG. 9A  FIG. 9B
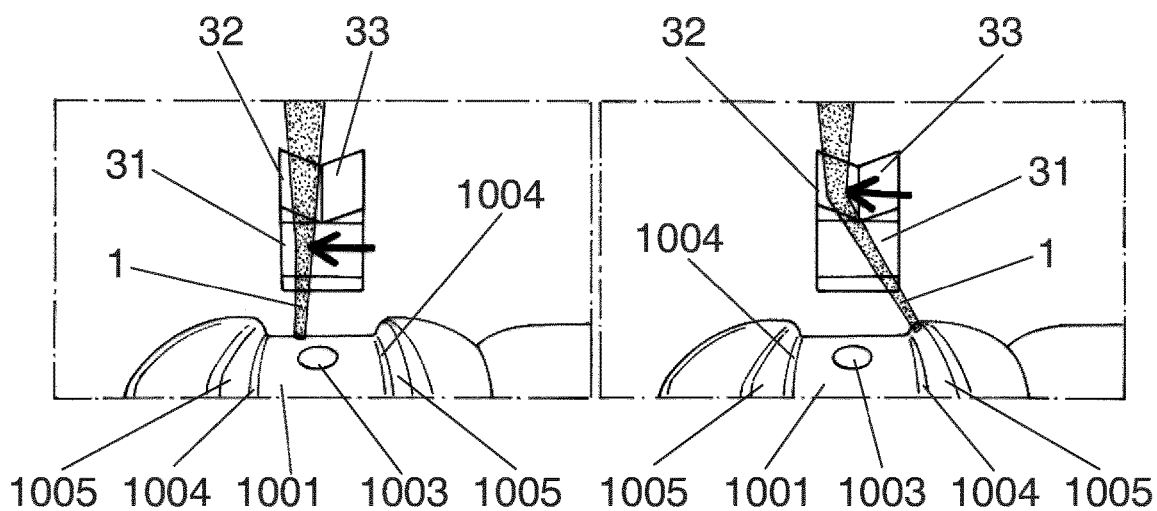
FIG. 9C  FIG. 9D
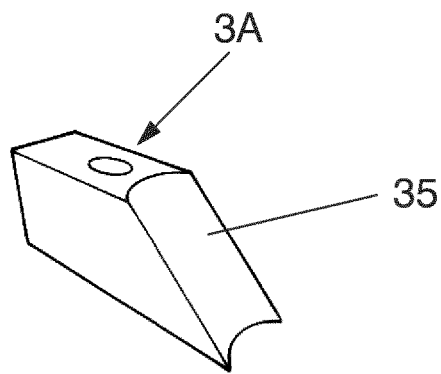
FIG. 10

METHOD AND APPARATUS FOR HEAT TREATMENT OF A FERROUS MATERIAL USING AN ENERGY BEAM

TECHNICAL FIELD

The present disclosure relates to the treatment of objects using an energy beam, for example, for the purpose of hardening one or more surfaces portions of an object.

BACKGROUND

It is well known in the art to carry out heat treatment of objects using an energy beam, such as a laser beam, for example, in order to harden ferrous materials, such as medium carbon steel, by heating the material to a high temperature, below its melting temperature, and subsequently quenching it, that is, cooling it rapidly enough to form hard martensite. Heat treatments with energy beams are also known for other purposes, for example, for softening one or more selected portion portions previously hardened object, such as a sheet metal object.

For example, surface hardening can be used to increase the wear resistance of the material and can sometimes also be used to increase fatigue strength caused by residual compressive stresses. Surface hardening can be useful for hardening surfaces that will be subjected to substantial wear when in use, for example, bearing surfaces, such as journal surfaces of crankshafts.

Using an energy beam such as a laser light beam for heat treatment of a workpiece, such as for surface hardening, involves several advantages: a laser beam is essentially independent of the workpiece, is easily controlled, requires no vacuum, and generates no combustion products. Also, as the beam generally only heats the metal product or workpiece locally, the rest of the workpiece can act as a heat sink, assuring rapid cooling, which is also known as self-quenching: the cold interior of the workpiece may constitute a sufficiently large heat sink to quench the hot surface by heat conduction to the interior at a rate high enough to allow martensite to form at the surface. Thus, the need for external cooling media, such as cooling fluids, can be obviated.

One problem involved with the use of an energy beam as the heat source in for example metal hardening processes is that the width of the heated zone is limited by the dimensions of the spot projected on the surface of the workpiece. It is known to use optics to modify the shape of the spot, for example, to provide a substantially rectangular spot having a more or less uniform energy distribution. As an alternative, scanning means (such as a scanning mirror associated with drive means) can be used to repetitively move the spot over a track, so that the heat source can be considered a rectangular source which can then be moved along the track, for example, by producing a relative movement between workpiece and the source of the beam, for example, by rotating a workpiece such as a crankshaft.

In spite of its advantages, laser hardening is often not used because there seems to exist a belief that the production rate will not be high enough for many practical applications of this technique, and because it difficult to achieve that all the parts that are to be heated will be heated to the desired extent. For example, in the case of surface hardening, correct heating is essential to make sure that hardening and tempering is achieved, with the necessary depths, but without causing damage by overheating.

For example, a crankshaft (the part of the engine that translates reciprocating linear piston motion into rotation) is a complex product that has often been conceived as difficult to harden by laser light. An example of a crankshaft is shown in FIG. 1. The crankshaft 1000 is a forged or casted steel product, having two or more centrally-located coaxial cylindrical journals 1001 (also known as the "main journals") and one or more offset cylindrical crankpin journals 1002 (also known as "rod journals"), separated by counterweights and webs that establish walls 1005 extending substantially perpendicularly to the surfaces of the journals. The complex shape of the product can make it difficult to correctly "scan" the surface with the laser beam; the tracks or areas to harden can have different widths and/or be asymmetric and/or be arranged in different planes (which is the case with the walls 1005 and the surfaces of the journals 1001 and 1002). Also, special care may need to be taken in correspondence with the fillets 1004, that is, the transition between the journals and the walls 1005. Also, the presence of the oil lubrication holes 1003 has to be taken into account.

Thus, today, high-frequency induction heating followed by a polymer-based water quench process is frequently used for the hardening of crankshafts. However, this process, although proven to be useful for achieving the desired hardening, involves certain drawbacks. For example, the inductors for creating heating by induction have to be designed in accordance with the specific design of the crankshaft, which reduces flexibility: to adapt an induction machine to a new kind of crankshaft can be time-consuming and costly. Further, heating by induction is costly in terms of the energy required to heat the crankshaft to the desired extent. Additionally, the cooling process is complex, costly and challenging from an environmental point of view, due to the use of large amounts of cooling fluid that are needed. Besides, parameters such as cooling fluid temperature and flow have to be carefully controlled to ensure a correct hardening process.

Thus, hardening using laser light as the heat source can be an attractive alternative in terms of flexibility, environmental-friendliness, energy consumption, and costs.

Attempts have been made to adapt the heat treatment to the particularities of the object to be heat treated. For example, DE-3905551-A1 teaches that the energy distribution within the laser beam can be adapted to the geometry of the surface being heated. The laser beam is applied to the concave surface at the fillets.

It is well known in the art to use mirrors placed at appropriate locations for directing a laser beam onto a surface to be treated with an appropriate angle of incidence, cf., for example, WO-2014/201788-A1, US-2014/0261283-A1, DE-102009034472-A1, WO-2006/114445-A1, and JP-59-076816-A2.

In the case of laser surface treatment of products with complex surfaces, such as camshafts or crankshafts, attention has to be paid to the problem of accessing the different portions of the surface to be hardened. For example, DE-102010048645-A1 discusses, with reference to a process for hardening of crankshafts, the problem of accessing certain portions, such as the portions towards the ends of the journals, the fillets or the walls of the counterweights adjacent to the fillets. In order to achieve an appropriate coupling of the laser beam with the material in the area to be heated, an appropriate angle between the beam and the surface is desired, for example, it may be desired that the laser beam be close to perpendicular or orthogonal to the surface to be treated. When the angle is not appropriate, the laser beam may to a substantial extent be reflected off the surface, so that energy is not absorbed. DE-102010048645-A1 discusses these problems and teaches a solution based on the use of a scanning mirror that redirects laser light and that can be turned so as to displace the laser spot projected onto the surface to be treated, in relation to that surface.

JPS627821A teaches laser treatment of the fillets of a crankshaft, dividing the laser beam in a manner so as to heat different portions of the fillet to uniform temperature for uniform quenching, and using reflecting mirrors to direct the laser beams towards the fillets. Also JPS61227132A teaches the quenching of journals including fillets of a crankshaft, in this case using a mirror for scanning a laser beam along the journal.

Many prior art approaches for heat treatment (such as hardening) of workpieces (such as crankshafts) based on an energy beam are basically based on projecting the beam onto the surface to be treated, creating a spot on that surface whereby heating of the surface takes place in correspondence with that spot, and then displacing this spot along and/or across the surface area to be hardened, for example, following a meandering track over said surface area, until the entire surface area has been heated.

WO-2014/037281-A2, the content of which is incorporated herein by reference, teaches a different approach based on dynamic adaptation of the two-dimensional energy distribution of a spot, for example, of a virtual or effective spot produced by rapid and repetitive two-dimensional scanning of a primary spot. For example, in one of the embodiments disclosed in WO-2014/037281-A2, a method for laser hardening of a surface of a workpiece comprises:

projecting a laser beam from a laser source onto a journal of the crankshaft, so as to produce a laser spot on said area;

generating a relative movement between the surface of the workpiece and the laser source, for example, by rotating the crankshaft, thereby allowing the laser spot to subsequently be projected onto different portions of said surface area;

during said relative movement, repetitively scanning the laser beam across the respective portion of the journal in two dimensions so as to produce a two-dimensional equivalent effective laser spot on the journal, said effective laser spot having an energy distribution;

wherein the energy distribution is adapted so that it is different in a more heat sensitive subarea such as in the area adjacent to an oil lubrication hole, than in a less heat sensitive subarea, so as to prevent overheating of the more heat sensitive subarea. The scanning in two dimensions can be carried out at a high speed, so that the scanning pattern used to create the effective spot is repeated with a frequency of more than 10 Hz, 50 Hz, 100 Hz or more. Features such as the scanning pattern, the speed of the primary spot along the scanning pattern (for example, along different segments thereof) and/or the power of the laser beam can be dynamically adapted to optimize the way in which heating is taking place, so as to avoid overheating of, for example, the area adjacent to an oil lubrication hole. The scanner, such as a two-dimensional or three-dimensional scanner, is advantageously placed at a certain distance from the journal, a distance several times the length of the journal. Thereby, the primary laser spot can be displaced rapidly along and across the surface of the journal, without extremely high requirements on the velocity of the elements of the scanner, such as the scanning mirrors. Also, in this way, the angle of incidence of the laser beam onto the journal of the crankshaft is substantially the same along the entire journal, from one end of the journal to the other end of the journal.

FIGS. 2A-2C show how, when applying the teachings of WO-2014/037281-A2, the two-dimensional energy distribution of an effective laser spot 12 (that is, the energy distribution along and across the surface of the object, that is, the energy distribution along and across the effective spot as projected onto the surface of the object) can be adapted to accommodate for an oil lubrication hole. The oil lubrication hole 1003 is positioned in a surface of a journal of a crankshaft, and said surface extends in a first direction parallel with the axis of rotation of the crankshaft, and in a second, circumferential direction W. In FIG. 2A, a substantially rectangular equivalent effective laser spot 12 is used, having a leading portion 12A with higher power density and a trailing portion 12B with lower power density. However, as shown in FIG. 2B, when the oil lubrication hole 1003 approaches the effective laser spot 12 due to the relative movement between the surface of the crankshaft and the laser source due to, for example, rotation of the crankshaft around its longitudinal axis, the energy distribution is substantially adapted by reducing the power or energy density towards the center of the leading portion 12A, so as to avoid overheating of the area adjacent to the oil lubrication hole 1003. Here, the effective laser spot is substantially U-shaped. Subsequently, once the oil lubrication hole 1003 has passed the leading portion 12A, the original energy distribution at the leading portion is restored, whereas the energy distribution at the trailing portion 12B is adapted to accommodate for the oil lubrication hole 1003, by reducing the energy or power density towards the center of the trailing portion. Here, the effective laser spot 12 substantially adopts an inverted-U-shape. That is, while the oil lubrication hole is passing through the effective laser spot, the energy distribution is adapted so as to apply less energy to the more heat sensitive area adjacent to the oil lubrication hole, than what is applied to the surface to be hardened away from said oil lubrication hole. The area around the oil lubrication hole can be hardened without harming the more heat sensitive subarea adjacent to the oil lubrication hole; the lateral portions of the U-shaped effective laser spot serve to harden the areas at the sides of the oil lubrication hole. The change in energy distribution illustrated in FIGS. 2A-2C can, for example, be obtained by adapting the scanning pattern, and/or by adapting the way in which the beam power is distributed along the scanning pattern (for example, by adapting the way in which the laser beam is switched on and off during different segments of the scanning pattern), and/or by adapting the scanning speed in correspondence with different segments of the scanning pattern, etc.

FIG. 3 schematically illustrates how the surface of two journals of a crankshaft have been hardened in an area 1001A and 1002A, respectively, extending along a major portion of the respective journal. In the case of the hardened area 1001A, it extends over most of the main journal 1001, from close to one fillet 1004 to close to another fillet 1004. The fillets are of the undercut type; this kind of undercuts are generally provided for treating the fillets by rolling.

SUMMARY

Sometimes, it may be desired to harden also the fillets, and even a portion of the wall beyond the fillet; this wall is frequently generally perpendicular to the surface of the journal. For example, FIG. 4 schematically illustrates a cross section along a longitudinal axis of a journal of a crankshaft, where the hardening has been carried out not only between the fillets, but also at the fillets and beyond them. As shown in FIG. 4, the hardened region comprises a portion 1005A extending above the fillet, along part of one of the walls 1005, a portion 1004A at the fillet, a portion 1001A corresponding to the surface of the journal 1001 between the fillets, a portion 1004A at the other fillet, and a portion 1005A above that fillet, in correspondence with the opposite wall 1005.

A problem when trying to obtain this kind of hardening using the approach disclosed in WO-2014/037281-A2 is that whereas the laser beam is substantially perpendicular to the surface of the journal 1001, it will not be substantially perpendicular to the walls 1005. This is schematically illustrated in FIG. 5, which shows a laser beam 1 projected from a schematically illustrated scanner 2, tracing a scanning pattern on one of the journals of the illustrated crankshaft. Whereas the laser beam 1 will be substantially perpendicular to the surface of the crankshaft all along the journal 1002, the angle of incidence will be different at the fillets, due to their curvature, and the laser beam will actually be substantially parallel to the walls 1005. This can be understood when viewing FIG. 5, which schematically illustrates how a scanner, for example, a two-dimensional scanner 2 can be used to focus a laser beam onto a journal 1002 of a crankshaft, and rapidly displacing the primary laser spot 11 following a scanning pattern (schematically illustrated as a set of parallel lines in FIG. 5) so as to establish a larger virtual or effective laser spot 12. As long as this effective spot 12 is limited to the surface of the journal between the fillets 1004, and as long as it is limited to a rather restricted portion of the journal in the circumferential direction of the journal, the beam 1 will be substantially perpendicular to the surface of the journal all throughout the effective spot 12. However, the same would not be true if the effective spot is extended to cover the fillets and a portion of the walls 1005 above the fillets. Here, the angle of incidence would be different; actually, as can be seen in FIG. 5, the laser beam is substantially parallel to the wall 1005.

One possible solution to this problem, based on the teachings of DE-102010048645-A1, would be to position the scanner close to the journal 1002, between the walls 1005. Thereby, the laser beam projected onto the walls would no longer be substantially parallel to the walls. However, this approach would involve other drawbacks.

One of these drawbacks is that the angle of incidence between the laser beam and the surface of the journal would vary substantially as the beam is swept along the journal in parallel with the longitudinal axis of the journal. Another, and maybe bigger, drawback is the fact that the scanner would need to carry out a larger angular sweep of the laser beam. When the scanner is relatively far away from the surface of the journal, to sweep the beam from one end to the opposite end of the journal may only require a small variation, such as by a few degrees or less, of the position of the corresponding scanning mirror or mirrors or similar. If the scanner is placed much closer to the surface, for a given scanning pattern the angular movement of the mirrors has to be increased.

Also, for a given velocity of the primary spot along the scanning pattern or along segments of the scanning pattern, if the scanner is placed much closer to the surface, the speed of movement of the components such as the mirror or mirrors of the scanner has to be increased accordingly. This can be problematic, especially if a high velocity of the primary spot is desired, which is often the case, as a high repetition rate of the scanning pattern is often desired to minimize temperature fluctuations between subsequent sweeps of the primary spot along the scanning pattern, as explained in WO-2014/037281-A2.

A first aspect of the disclosure relates to a method for heat treatment of an object, for example, for the purpose of hardening, softening, etc. In some embodiments of the disclosure, the object is of a ferrous materials, such as steel, such as medium carbon steel. In some embodiments of the disclosure, the object is a crankshaft or a camshaft. In some embodiments of the disclosure, the object is a sheet metal object.

The method comprises the step of heating at least one selected portion of the object by:

projecting an energy beam such as a laser beam onto a surface of the object so as to produce a primary spot on the surface of the object, operating a scanner so as to repetitively scan the beam to displace the primary spot in accordance with a first scanning pattern so as to establish an effective spot on the surface of the object, said effective spot having a two-dimensional energy distribution, and displacing said effective spot in relation to the surface of the object, for example, by moving the surface of the object in relation to the scanner or vice-versa or both, to progressively heat the at least one selected portion of the object. That is, the effective spot can be displaced until the entire selected portion of the object has been heated.

In accordance with the disclosure, the beam follows an optical path between the scanner and the primary spot, and a beam deflector device is placed in the optical path to redirect the beam onto the surface of the object.

Thus, and whereas the scanner as such can be placed at a certain or substantial distance from the surface onto which the beam is projected (for example, to allow for a relatively rapid movement of the primary spot along the first scanning pattern with a relatively slow movement of the mirror or mirrors of the scanner or of other beam deflector devices of the scanner, and/or to allow for a relatively large extension of the first scanning pattern in at least one direction without requiring a very large amplitude of the angular movement of the corresponding mirror or mirrors or other deflector devices of the scanner), the beam deflector device can be placed closer to the surface of the object, such as relatively close to the surface, for example, in the case of a crankshaft, even between the counterweights. For example, in some embodiments of the disclosure, the scanner can be placed at a distance of 100-1000 mm or more from the surface onto which the primary spot is projected, whereas the beam deflector device can be placed at a distance of 10 to 100 mm from that surface. In many embodiments of the disclosure the beam deflector device is generally rather small and the design thereof is simple, and its function is primarily to redirect the beam towards different subportions of the selected portion to be heated. For example, when the object is a crankshaft, at one moment the beam deflector device can redirect the beam towards the journal of the crankshaft and at another moment towards a fillet and/or wall at one end of the journal, and at another moment towards the fillet and/or wall of the other end of the journal. These different moments can correspond to different parts of a scanning pattern followed by the beam arriving from the scanner, that is, different parts of a beam scanning pattern. Thus, during one sweep of the beam along its scanning pattern, the beam can be sequentially redirected to the journal, to the fillet and/or wall at one end of the journal, and to fillet and/or wall at the other end of the journal.

Thereby, a scanner placed at a certain or substantial distance from the journal of the crankshaft can be combined with an appropriate angle between the laser beam and the journal, its fillets and the adjacent wall portions of the crankshaft. For example, in embodiments when the object is a crankshaft of an automobile or truck, the scanner can typically be placed at a distance of 100 mm to 1000 mm or more from the journal to be heated, whereas the beam deflector device can be placed much closer to the journal, for example, at a distance of from 10 to 100 mm from the surface of the journal. It is often desired that the distance between the effective surface of the beam deflector device and the journal is not much larger than the width of the journal, such as not more than 1, 1.5 or 2 times the width of the journal, in order to provide for appropriate angles of incidence between the beam and the different subportions of the surface to be heated.

That is, due to the use of the beam deflector device, the first scanning pattern can extend over different portions of the object, such as over the journal and the fillets and also the walls adjacent to the fillets, whereas the angle between the beam and the corresponding surface will always be much larger than 0, for example, always larger than 30 degrees, 45 degrees, 60 degrees or more. Thus, the drawback explained above in relation to FIG. 5 is overcome. The beam deflector device can thus be used to redirect the beam during the scanning of the beam.

In some embodiments of the disclosure the object is a camshaft or a crankshaft, and the selected portion to be heat treated can include a journal, as well as the fillets at the ends of the journal and/or portions of the walls adjacent to the fillets.

Although reference has been made to the heat treatment such as laser hardening of objects such as crankshafts and camshafts, these are just examples. The method can be applied to different kinds of heat treatment and to different kinds of objects, where the heat treatment is carried out using an energy beam and a scanner. The method can be especially advantageous in the case of heat treatment of objects featuring complex shapes, for example, when surface portions with different orientations in space are to be subjected to heat treatment using a scanner.

In many embodiments of the disclosure the energy beam is a beam of electromagnetic radiation, for example, a laser beam. The effective spot can be created and adapted using, for example, any of the techniques described in WO-2014/037281-A2, which is incorporated herein by reference.

In accordance with the described disclosure, at a given moment, the effective spot generated by the scanning of the primary spot heats part of said selected portion, and the effective spot is displaced over the surface of the object until the selected portion has been heated as desired. The displacement of the effective spot in relation to the surface can be carried out in accordance with a second scanning pattern. That is, the real/primary spot, that is, the spot that is produced by the beam at any given moment, is scanned in accordance with a first scanning pattern to create the effective spot, and this effective spot can be displaced in accordance with the second scanning pattern. Thus, two types of movement are combined or overlaid: the movement of the primary spot in accordance with the first scanning pattern, and the movement of the effective spot in accordance with the second scanning pattern, which in some embodiments of the disclosure can be a simple straight line. For example, when the object to be heat treated is a crankshaft, the effective spot can be displaced in relation to the surface of a journal including fillets and wall portions adjacent to the fillets, by rotating the crankshaft, so that the effective spot is displaced in the circumferential direction of the journal.

The term "two-dimensional energy distribution" refers to the manner in which the energy applied by the energy beam is distributed over the effective spot, for example, during one sweep of the primary spot along the first scanning pattern. When the effective spot is projected onto a non-planar portion or area, such as a curved portion or area such as a portion or area featuring bends, the term "two-dimensional energy distribution" refers to how the energy is distributed along and across the surface of the object, that is, to the energy distribution along and across the effective spot as projected onto the surface of the object.

The first scanning pattern is generally determined by, at least, a beam scanning pattern according to which the beam is scanned by the scanner, and the beam deflector device which redirects the beam. Thus, both the scanner and the beam deflector device determine, in combination, the first scanning pattern, that is, the scanning pattern followed by the primary spot on the surface of the object.

The present disclosure allows for a relatively rapid heating of a substantial area of the surface of the object, due to the fact that the effective spot can have a substantial size, such as, for example, more than 4, 10, 15, 20 or 25 times the size (area) of the primary spot. Thus, heating a certain region or area of the object to a desired extent in terms of temperature and duration can be accomplished more rapidly than if the heating is carried out by simply displacing the primary spot over the entire area, for example, following a sinusoidal or meandering pattern, or a straight line. The use of an effective spot having a relatively large area allows for high productivity while still allowing the relevant portion or portions of the surface to be heated for a relatively substantial amount of time, thereby allowing for, for example, less aggressive heating without compromising productivity.

The primary spot can have an area substantially smaller than the one of the effective spot. For example, in some embodiments of the disclosure, the primary spot has a size of less than 4 mm$^2$, such as less than 3 mm$^2$, at least during part of the process. The size of the primary spot can be modified during the process, so as to optimize the way in which each specific portion of the object is being heat treated, in terms of quality and productivity.

On the other hand, the use of an effective spot created by scanning the primary spot repetitively in two dimensions in accordance with a first scanning pattern, makes it possible to establish an effective spot having a selected two-dimensional energy distribution, which is substantially independent of the specific optics (lenses, mirrors, etc.) being used, and which can be tailored and adapted to provide for an enhanced or optimized heating of the object, from different points of view, including the speed with which the heat treatment is completed (for example, in terms of cm$^2$ per minute or in terms of terminated units per hour), and quality. For example, the heat can be distributed so that a leading portion of the effective spot has a higher energy density than a trailing portion, thereby increasing the speed with which a desired temperature of the surface is reached, whereas the trailing portion can serve to maintain the heating for a sufficient time to reach a desired depth and/or quality, thereby optimizing the velocity with which the effective spot can be displaced in relation to the surface of the object, without renouncing on the quality of the heat treatment. Also, the two-dimensional energy distribution can be adapted depending on the characteristics of the object, for example, so as to apply less heat in areas adjacent to an edge of the object or an opening in the object—such as an oil lubrication hole in a crankshaft, where cooling due to heat transfer is slower. Also, the effective spot can be adapted in accordance to the tri-dimensional shape of the object, for example, to adapt the heating to the curvature, width, etc., of the object in the area being heated, and to the configuration of the portion of the object that is to be heated. The shape of the effective spot and/or the two-dimensional energy distribution can be adapted whenever needed, thereby adapting the process to the specific part of the object that is to be heated at any given moment. In some embodiments of the disclosure, the two-dimensional energy distribution can be varied as a function of the respective irradiation site on the object, taking into account, for example, the heat removal capability of a surrounding region. In some embodiments of the disclosure, the two-dimensional energy distribution can be varied taking into account desired characteristics of the product in different regions of the product, such as different requirements on hardness, rigidity, softness, ductility, etc.

Additionally, using the effective spot, created by the scanning of the primary spot, increases flexibility in terms of, for example, adaptation of a system to different objects to be produced. For example, the need to replace or adapt the optics involved can be reduced or eliminated. Adaptation can more frequently be carried out, at least in part, by merely adapting the software controlling the scanning of the primary spot and, thereby, the two-dimensional energy distribution of the effective spot.

The expression "first scanning pattern" does not imply that the primary spot must always follow one and the same scanning pattern when creating the effective spot, but is merely intended to distinguish the scanning pattern of the primary spot that is used to create the effective spot, from the scanning pattern or track along which the effective spot is displaced or scanned in relation to the object being subjected to the heat treatment; the scanning pattern followed by the effective spot is sometimes referred to as a second scanning pattern.

In many embodiments of the disclosure, the velocity or mean or average velocity with which the primary spot is displaced in accordance with the first scanning pattern is substantially higher than the velocity with which the effective spot is displaced in relation to the surface of the object. A high velocity of the primary spot along the first scanning pattern reduces the temperature fluctuations within the effective spot during each sweep of the primary spot along the first scanning pattern.

In most prior art systems for heat treatment using an energy beam, the area being heated at each moment substantially corresponded to the primary spot projected by the beam onto the surface. That is, in most prior art arrangements, the area being heated at each moment had a size that substantially corresponded to the one of the primary spot, and the width of the track being heated substantially corresponded to the width of the primary spot in the direction perpendicular to the direction in which the primary spot was being displaced, which in turn was determined by the source of the beam, such as a laser, and the beam shaping means, such as the optics used.

Of course, the present disclosure does not exclude the possibility of carrying out part of the heat treatment operating with the primary spot in a conventional way. For example, the primary spot can be displaced to carry out the heating in correspondence with the outline or contour of a region to be heated, or to carry out heating of certain details of the object being heated, whereas the effective spot described above can be used to carry out the heating of other parts or regions of the surface, such as a main portion of a region to be heated. The skilled person will chose the extent to which the effective spot rather than the primary spot will be used to carry out the heating, depending on issues such as productivity and the need to carefully tailor the outline of a region to be heated or a certain portion of an object being subjected to heat treatment. For example, it is possible to use the primary spot to outline a region to be heated, while the effective spot is used to heat the surface within the outlined region. In some embodiments of the disclosure, during the process, the first scanning pattern can be modified to reduce the size of the effective spot until it ends up corresponding to the primary spot, and vice-versa.

That is, it is not necessary to use the effective spot to carry out all of the heating that has to take place during the heat treatment of the object. However, at least part of the heat treatment is carried out using the effective spot described above. For example, it can be preferred that during at least 50%, 70%, 80% or 90% of the time during which the beam is applied to the object, it is applied so as to establish the effective spot as explained above, that is, by repetitively scanning the primary spot in accordance with the first scanning pattern.

In some embodiments of the disclosure, the two-dimensional energy distribution of the effective spot is dynamically adapted during displacement of the effective spot in relation to the surface of the object. Thereby, adaptation of the effective spot to the area or region of the object currently being heated can be accomplished, for example, in the case of a crankshaft, so as to prevent overheating of the area adjacent to an oil lubrication hole. The expression dynamic adaptation is intended to denote the fact that adaptation can take place dynamically during displacement of the effective spot. Different means can be used to achieve this kind of dynamic adaptation, some of which are mentioned below. For example, in some embodiments of the disclosure, the scanner can be operated to achieve the dynamic adaptation (for example, by adapting the operation of galvanic mirrors or other scanning means, so as to modify the first scanning pattern and/or the velocity of the primary spot along the scanning pattern or along one or more segments or portions thereof), and/or the beam power and/or the size of the primary spot can be adapted. Open-loop or closed-loop control can be used for controlling the dynamic adaptation. The dynamic adaptation can affect the way in which the energy is distributed within a given area of the effective spot, and/or the actual shape of the effective spot, and thus the shape of the area being heated at any given moment (disregarding the fact that the primary spot is moving, and just considering the effective spot). For example, the length and/or the width of the effective spot can be adapted dynamically during the process.

In some embodiments of the disclosure, adaptation of the two-dimensional energy distribution of the effective spot is carried out by adapting the power of the beam, such as by selectively turning the beam on and off. This includes interruption of the beam at its source, as well as other options such as interruption of the beam by interference with the path of the beam, for example with a shutter, and combinations thereof. For example, when using a laser such as a fiber laser, the laser beam can be switched on and off very rapidly, thus making it possible to obtain a desired energy distribution by turning the laser beam on and off while following the scanning pattern. Thus, heating can be achieved by turning the laser beam on during certain lines or parts of lines of the scanning pattern. For example, a pixelized approach can be adopted, according to which the two-dimensional energy distribution is determined by the on/off state of the laser during the different portions or segments of the first scanning pattern.

In some embodiments of the disclosure, adaptation of the two-dimensional energy distribution of the effective spot is carried out by adapting the first scanning pattern.

In some embodiments of the disclosure, adaptation of the two-dimensional energy distribution of the effective spot is carried out by adapting the velocity with which the primary spot moves along at least a portion of the first scanning pattern.

That is, the two-dimensional energy distribution can be adapted by adapting, for example, the power of the beam—for example, by switching between different power states such as between on and off, and/or by adapting the scanning pattern—for example, adding or leaving out segments, or modifying the orientation of segments, or completely changing a pattern for another one, and/or by adapting the velocity with which the beam moves along the scanning pattern, such as along one or more segments thereof. The choice between different means for adapting the two-dimensional energy distribution can be made based on circumstances such as the capacity of the equipment to rapidly change between power states of the beam, and on the capacity of the scanner to modify the pattern to be followed and/or the speed with which the primary spot moves along the scanning pattern.

In some embodiments of the disclosure, focus of the beam is dynamically adapted during displacement of the primary spot along the first scanning pattern and/or during displacement of the effective spot in relation to the object being produced. For example, when a laser beam is used, the laser focus along the optical axis can be dynamically modified during the process, for example, so as to vary or maintain the size of the primary laser spot while it is being displaced along the first scanning pattern, and/or while the effective laser spot is being displaced in relation to the surface of the object. For example, the optical focus can be adapted to keep the size of the primary spot constant while the primary spot is moving over the surface of the object (for example, to compensate for varying distances between the laser source or the scanner and the position of the primary laser spot on the surface of the object).

In some embodiments of the disclosure, the size of the primary spot is dynamically adapted during displacement of the primary spot along the first scanning pattern and/or during displacement of the effective spot in relation to the surface of the object, so as to modify the two-dimensional energy distribution and/or the size of the effective spot.

In some embodiments of the disclosure, during at least one stage of the method, the effective spot comprises a leading portion having a higher energy density than a trailing portion of the effective spot (this arrangement can be preferred when it is desired to rapidly reach a certain temperature, and thereafter provide sufficient energy input to, for example, keep the material at the required temperature for a certain amount of time), or the effective spot comprises a leading portion having a lower energy density than a trailing portion of the effective spot (this arrangement can be preferred when it is desired to first pre-heat the material for some time, prior to making it reach a certain temperature). In some embodiments of the disclosure, the effective spot comprises an intermediate portion having a higher energy density than a leading portion and a trailing portion of the effective spot. In some embodiments of the disclosure, the effective spot features a substantially uniform energy distribution, with a substantially constant energy density throughout the effective spot.

As indicated above, the two-dimensional energy distribution can be adapted dynamically while the method is being carried out, for example, so that it is different in relation to different portions of the surface of the object.

In some embodiments of the disclosure, the mean or average velocity of the primary spot along the first scanning pattern is substantially higher than the mean or average velocity with which the effective spot is displaced in relation to the surface of the object. For example, the average velocity of the primary spot along the first scanning pattern can preferably be at least ten times higher, more preferably at least 100 times higher, than the average velocity with which the effective spot is displaced in relation to the object. A high velocity of the primary spot reduces the temperature fluctuations within the effective spot during one sweep of the primary spot along the first scanning pattern.

In some embodiments of the disclosure, the beam is scanned in accordance with said first scanning pattern so that said first scanning pattern is repeated by the beam with a frequency of more than 10, 25, 50, 75, 100, 150, 200 or 300 Hz (i.e., repetitions of the scanning pattern per second). A high repetition rate can be appropriate to reduce or prevent non-desired temperature fluctuations in the areas being heated by the effective spot, between each scanning cycle, that is, between each sweep of the beam along the first scanning pattern. In some embodiments of the disclosure, the first scanning pattern remains constant, and in other embodiments of the disclosure, the first scanning pattern is modified between some or all of the sweeps of the beam along the first scanning pattern.

In some embodiments of the disclosure, the size (that is, the area) of the effective spot, such as the average size of the effective spot during the process or the size of the effective spot during at least one moment of the process, such as the maximum size of the effective spot during the process, is more than 4, 10, 15, 20 or 25 times the size of the primary spot. For example, in some embodiments of the disclosure, a primary spot having a size in the order of 3 mm$^2$ can be used to create an effective spot having a size of more than 10 mm$^2$, such as more than 50 or 100 mm$^2$ or more. The size of the effective spot can be dynamically modified during the process, but a large average size can often be preferred to enhance productivity, and a large maximum size can be useful to enhance productivity during at least part of the process.

The method can be carried out under the control of electronic control means, such as a computer.

As indicated above, the first scanning pattern is determined at least in part by the way in which the beam is scanned by the scanner, that is, the beam scanning pattern. It is also influenced by the beam deflector device. In some embodiments of the disclosure, the first scanning pattern and/or the beam scanning pattern is a polygonal scanning pattern comprising a plurality of lines. For example, the (first and/or beam) scanning pattern can be a polygon such as a triangle, a square or a rectangle, a pentagon, a hexagon, a heptagon, an octagon, etc. The polygon does not need to be a perfect polygon, for example, the lines making up the polygon can in some embodiments be more or less curved and the edges of the polygon where the lines meet can be rounded, etc.

In some embodiments of the disclosure the first scanning pattern and/or the beam scanning pattern comprises a plurality of lines, such as a plurality of straight or curved lines, which in some embodiments of the disclosure are arranged substantially parallel with each other. In some embodiments of the disclosure, there are two, three, four or more of these lines.

In some embodiments of the disclosure, the first scanning pattern and/or the beam scanning pattern comprises at least three segments, and said scanning of the energy beam is carried out so that said beam and/or the primary spot follows at least one of said segments more frequently than it follows at least another one of said segments. This arrangement is advantageous in that it enhances flexibility and the way in which the scanning pattern can be used to provide an adequate and, whenever desired, symmetric or substantially symmetric energy distribution. For example, one of said segments can be used as a path or bridge followed by the beam when moving between two other segments, so that the transfer of the spot projected by the beam between different portions (such as an end and a beginning) of the scanning pattern can be carried out using segments (such as intermediate segments) of the scanning pattern for the transfer, whereby the transfer can often be carried out without turning off the beam and without distorting the symmetry of the two-dimensional energy distribution, when such symmetry is desired.

In some embodiments of the disclosure, the scanning pattern comprises at least three substantially parallel straight or curved lines distributed one after the other in a first direction, said lines generally extending in a second direction, wherein said at least three lines comprise a first line, at least one intermediate line, and a last line arranged one after the each other in said first direction, wherein the scanning of the beam is carried out so that the beam and/or the primary spot follows said intermediate line more frequently than said beam follows said first line and/or said last line. That is, for example, the beam can on an average follow said intermediate line twice as often as it follows said first line and said last line, for example, the beam can travel along the intermediate line each time it moves from the first line towards the last line, and vice-versa. That is, the intermediate line or lines can serve as a kind of bridge followed by the beam and/or by the projected spot when moving between the first and the last line.

This arrangement has been found to be practical and easy to implement, and it has been found that adequate energy distributions can often be obtained by adapting scanning speed and without substantially adapting the power of the beam. It is also possible to modify the power of the beam during scanning so as to tailor the energy distribution, but rapid switching of the power is not always possible or desirable, and having the beam, such as a laser beam, at a low power level or switched off during substantial parts of the scanning cycle may imply a sub-optimal use of the capacity of the equipment, which can be a serious disadvantage when the equipment, such as a laser equipment, is used for heat treatment of objects. Thus, it is often desirable to operate with the beam fully in the on state, to take full advantage of the available power.

It is often desirable to use three or more lines arranged in this way, that is, one after the other in a direction different from, such as perpendicular to, the direction along which the lines extend, in order to achieve a substantial extension of the effective spot not only in the direction along the lines, but also in the other direction, so as to make the effective spot adequate for heating a sufficiently wide area to a sufficiently high temperature and to maintain the temperature at the desired level or levels during sufficient time, while allowing the effective spot to travel with a relatively high speed, thereby allowing for a high productivity. Thus, a substantial extension of the effective spot in two dimensions is often an advantage.

In some embodiments of the disclosure, the first or beam scanning pattern comprises at least three substantially parallel lines or segments, distributed one after the other in a first direction, such as in the direction along which the effective spot travels during the process, said lines extending in a second direction, such as in a direction perpendicular the first direction. In some embodiments of the disclosure, said at least three lines comprise a first line, at least one intermediate line, and a last line, arranged after each other in said first direction, and the scanning of the beam is carried out so that the beam and/or the projected spot is scanned along said lines according to a sequence in accordance with which the beam and/or the spot, after following said first line, follows said intermediate line, said last line, said intermediate line, and said first line, in that order.

The above definition does not mean that the scanning has to start with the first line, but just indicates the sequence according to which the beam and/or spot tracks or follows the above-mentioned lines of the scanning pattern. Also, it does not exclude that in between (such as before or after) following some or all of the lines indicated above, the beam and/or spot may follow other lines, such as lines interconnecting the first, last and intermediate lines, and/or additional intermediate lines.

That is, in these embodiments, after moving along the first line, the beam and/or the spot always follow said intermediate line twice before moving along the first line again. Whereas a more straight-forward approach might have been to carry out the scanning so that after said last line the beam and its projected spot return directly to said first line, it has been found that the sequence followed according to these embodiments of the disclosure is suitable to achieve a symmetric energy distribution about an axis of symmetry extending in said first direction.

In some embodiments of the disclosure, the scanning pattern comprises a plurality of said intermediate lines. The number of lines can be chosen by the operator or process designer or equipment designer depending on, for example, the size of the primary spot projected by the beam and the desired extension of the effective spot, for example, in the first direction. For example, a minimum number of lines can in some embodiments be three lines, but in many practical implementations a larger number of lines can be used, such as four, five, six, ten or more lines, when counting the first, the last and the intermediate lines. In some embodiments of the disclosure, the number of lines is modified to modify the energy distribution, while the effective spot is travelling along the surface portion where heating is to take place.

In some embodiments of the disclosure, the beam and/or the primary spot is displaced with a higher velocity along said at least one intermediate line than along said first line and last line. This is often preferred in order to achieve an adequate energy distribution in said first direction, at least during a portion or a substantial portion of the process. The higher velocity of the beam when moving along the intermediate lines, or at least when moving along one or some of them, compensates for the fact that the beam moves along said intermediate lines twice as often as it moves along the first and last lines. For example, the velocity of the beam and/or the primary spot along the intermediate lines can in some embodiments of the disclosure be about twice the velocity of the beam/spot along the first and/or last lines. The velocity can be different for different intermediate lines. The velocity for each line can be chosen in accordance with a desired energy distribution in the first direction. Now, the velocity with which the effective spot is displaced along different lines or segments of the scanning pattern can be dynamically modified while the effective spot is travelling along the area where heating is to take place, for example, to adapt the energy distribution to optimize the way in which the process is taking place, for example, in order to increase the quality of the product, for example, of the hardening and/or tempering.

In some embodiments of the disclosure, the scanning pattern further comprises lines extending in said first direction, between the ends of the first, last and intermediate lines, whereby the beam and/or the primary spot follows said lines extending is said first direction when moving between said first line, said intermediate lines and said last line. In some embodiments of the disclosure, the beam/spot is displaced with a higher velocity along said lines extending in the first direction, than along said first line and said last line, at least during part of the process.

In some embodiments of the disclosure, the beam is displaced along the scanning pattern without switching the beam on and off and/or while maintaining the power of the beam substantially constant. This makes it possible to carry out the scanning at a high speed without taking into account the capacity of the equipment, such as a laser equipment, to switch between different power levels, such as between on and off, and it makes it possible to use equipment that may not allow for very rapid switching between power levels. Also, it provides for efficient use of the available output power, that is, of the capacity of the equipment in terms of power.

In some embodiments of the disclosure, the first scanning pattern can be implemented in line with the teachings of WO-2014/037281-A2, for example, in line with the teachings in relation to FIGS. 9-11 thereof.

In some embodiments of the disclosure, the optical path comprises a first part extending between the scanner (for example, a last scanning mirror or a focusing lens of the scanner) and the beam deflector device, and a second part extending between the beam deflector device and the primary spot, the second part being smaller than said first part. That is, basically, the beam deflector device is placed closer to the primary spot than to the scanner. As indicated above, it is often desired to have the scanner at a substantial distance from the surface onto which the primary spot is projected, to allow for an extensive first scanning pattern and/or high velocity of the primary spot along the scanning pattern, without requiring wide and rapid angular movements of the beam deflector components of the scanner, such as the mirror or mirrors of the scanner. Contrarily, it is often desired to have the beam deflector device relatively close to the surface portions that are to be heat treated, for example, in the case of a crankshaft, it can be preferred to have the beam deflector device placed so that during rotation of the crankshaft, it will be placed between the counterweights or walls adjacent to the journals, so that the beam can be directed from the beam deflector device and onto the walls, fillets and also onto the journal of the crankshaft, under an angle that is as close to 90 degrees as possible, preferably larger than 30 degrees and even more preferably larger than about 45 degrees. In the case of crankshafts for motor vehicles such as automobiles and trucks, the first part can sometimes preferably be in the range from 200-1000 mm or more, whereas the second part is preferably in the range from 10-100 mm, the end points of the ranges being included. In some embodiments of the disclosure in which the object is a crankshaft, an effective surface of the beam deflector device (that is, a surface by which the beam is reflected, for example) is preferably placed at a distance from the surface of the journal to be heated that is not more than 1, 1.5 or 2 times the width of the journal (that is, the length of the journal along its longitudinal axis).

In some embodiments of the disclosure, the beam deflector device is a mirror. A mirror is a suitable beam deflector device for redirecting, for example, a light beam such as a laser beam.

In some embodiments of the disclosure, the beam deflector device comprises a plurality of regions, and the step of operating the scanner comprises directing the beam to at least two different regions of said plurality of regions, each of said plurality of regions corresponding to at least one part of said first scanning pattern. Said regions can for example comprise different regions of a curved mirror, or different flat or substantially flat regions or segments of a mirror oriented at different angles in relation to the scanner. Thus, during the scanning of the beam to make the primary spot follow the first scanning pattern, the beam can be deflected, by the beam deflector device, towards different portions of the object, for example, during one portion of the first scanning pattern the beam can be deflected towards a journal and/or fillets of a crankshaft, and during other portions of the first scanning pattern the beam can be directed towards the fillets and/or the walls adjacent to the fillets.

In some embodiments of the disclosure, the mirror comprises at least three different substantially flat surface portions with different spatial orientations, that is, oriented at different angles vs. the scanner, so that each of these surface portions can be arranged to redirect the beam towards a selected part or region of the object. Thereby, during the scanning of the laser beam with the scanner, the beam can sequentially be deflected first by one of said portions, then by another of said portions, and then by a third one of said portions, and thus redirected towards different parts of the object to be heat treated. The use of flat mirror portions can sometimes be preferred to reduce deformation of the shape of the primary spot. In some embodiments of the disclosure in which the object is a crankshaft, the three different substantially flat surface portions comprise a first surface portion, a second surface portion and a third surface portion, and the method comprises using the first surface portion for directing the beam towards a journal of the crankshaft, using the second surface portion for directing the beam towards a fillet and/or wall at a first end of the journal, and using the third surface portion for directing the beam towards a fillet (1004) and/or wall at a second end of the journal. It has been found that in this way, it becomes possible to heat both the journal and the walls as well as the fillets with a beam directed towards the corresponding surface portions at an appropriate angle, especially a beam being far from parallel to these surface portions, thereby overcoming the problem explained in relation to FIG. 5. For example, with the beam deflector device placed close to the journal, such as a distance from the journal similar to the width of the journal, the angle can be kept above 30 degrees, preferably above 45 degrees.

In some embodiments of the disclosure, the second surface portion and the third surface portion are arranged facing each other at an angle of more than 100 degrees and less than 170 degrees. Thereby, each of these portions can serve to direct the beam towards the fillet furthest away from it, that is, a left one of these surface portions can redirect the beam towards the right, and a right one of these surface portions can redirect the beam towards the left, thereby facilitating that the beam reaches the fillet and/or wall under an angle being as close to perpendicular as possible, preferably larger than 45 degrees.

In some embodiments of the disclosure, the mirror comprises at least one curved portion for deflecting the beam. A mirror with a curvature, such as a mirror with a cross section having the shape of a segment of a circle, such as a substantially U-shaped or parabolic mirror, can involve certain advantages, such as that re-direction of the beam can take place without sudden jumps, such as the jumps that can occur when the beam is displaced from one of the flat portions to another one of the flat portions of the embodiments described above, due to the discontinuity at the border between two flat portions placed at an angle to each other. However, a disadvantage with a curved mirror is that it may distort the shape of the primary spot. This may not always be desired.

In some embodiments of the disclosure, the object is a crankshaft (1000) and the beam deflector device is placed so that when the method is carried out, at least at some moments the beam deflector device is placed between two walls or counterweights of the crankshaft. An advantage with the above described combination of a scanner and a beam deflector device is that in some embodiments, the beam deflector device can be placed in such a close proximity to the journal of a crankshaft to be heat treated. The beam deflector device can, for example, have a relatively small dimension, and a very simple configuration, such as in the form of a mirror with two or more reflective surfaces placed at an angle to each other, or a mirror with only one curved surface.

In some embodiments of the disclosure, the beam deflector device and the scanner are displaced in synchronization with each other. For example, the beam deflector device can be directly or indirectly attached or coupled to the scanner so that is moves with the scanner, or the beam deflector device can be displaced by separate drive means, for example, synchronized with those of the scanner. The beam deflector device and the scanner can operate as a unit and be displaced as a unit in relation to the object, for example, prior to initiating the heat treatment of a portion of the object—for example, to position scanner and beam deflector device in a suitable longitudinal position along the object, such as in correspondence with a selected journal of a crankshaft, and/or during said heat treatment—for example, so as to maintain the distance to a surface of a rod journal during rotation of the crankshaft around the axis of the main journals-.

In some embodiments of the disclosure, the beam deflector device is static in relation to the scanner. What is meant by this is that the beam deflector device is not actively used for displacing the primary spot. Rather, the displacement of the primary spot is controlled by the scanner. The beam deflector device merely serves to deflect the beam received from the scanner. The beam deflector device can comprise a plurality of regions for redirecting the beam to different parts or subportions of the object. Thus, for a given beam deflector device, the first scanning pattern is substantially determined by the way in which the beam is scanned by the scanner. In other embodiments of the disclosure, the beam deflector device can be moveable, for example, in synchronism with the scanning carried out by the scanner, so as to contribute to the displacement of the primary spot along the first scanning pattern.

In some embodiments of the disclosure, the scanner is operated to scan the beam in two dimensions, so as to provide for an effective spot having an width in a first direction and a length in a second direction. Thereby, both said width and said length can be substantially larger than the largest diameter of the primary spot. The advantage of this kind of approach has been explained above.

In some embodiments of the disclosure, the effective spot is displaced in relation to the surface by rotating the object. For example, when the object is a crankshaft, the crankshaft can be rotated along its longitudinal axis, so that the effective spot is moved along the journals and, optionally, also fillets and the adjacent portions of the walls, in the circumferential direction of the journal. Thus, for example, hardening of the journal, including fillets and parts of the walls, can in some embodiments be achieved by sweeping the effective spot once around the journal in the circumferential direction.

In some embodiments of the disclosure, the two-dimensional energy distribution is dynamically adapted during displacement of said effective spot, so as to avoid overheating of a more heat sensitive subarea such as the area adjacent to an oil lubrication hole of a crankshaft.

Another aspect of the disclosure relates to an apparatus for heat treatment of an object, for example, of a crankshaft. The apparatus comprises:

means for supporting the object;

means for generating an energy beam;

a scanner for directing the energy beam onto a surface of the object so as to produce a primary spot on said surface, the scanner being arranged for repetitively scanning the beam in two dimensions to displace the primary spot in accordance with a first scanning pattern so as to establish an effective spot on the surface of the object, said effective spot having a two-dimensional energy distribution, means for displacing said effective spot in relation to the surface of the object (for example, by moving the surface of the object in relation to the scanner, or vice-versa, or both; for example, in the case of a crankshaft, the crankshaft can be rotated so as to expose different portions of the circumference of a journal to the scanner) to progressively heat the at least one selected portion of the object (that is, the effective spot can be displaced until the selected portion of the object has been heated), and a beam deflector device arranged to receive a beam from the scanner and redirect the beam towards the object.

The advantages involved with this arrangement are clear from our above description of the method. The beam deflector device is advantageously placed so that in the optical path from the scanner—such as from the last scanning mirror or the focusing lens of the scanner—to the position on the surface onto which the primary spot is projected—such as a journal of the crankshaft, a first part corresponds to the part from the scanner to the beam deflector device, and a second part corresponds to the part from the beam deflector device to the surface of the object, that is, to the primary spot. The first part is preferably longer than the second part, such as two, three or more times longer. For example, in many practical applications related to crankshafts in general and to crankshafts for automobiles or trucks in particular, the first part is equal to or larger than 200 mm, such as from 200 mm to 1000 mm or more, and the second part is equal to or larger than 10 mm, but not more than 100 mm.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures:

FIGS. 9A-9D schematically illustrate how the beam deflector device of FIG. 7 deflects the beam onto different portions of the crankshaft during a sweep of the primary laser spot along the first scanning pattern.

FIG. 10 is a perspective view of a beam deflector device according to another embodiment of the disclosure.

DETAILED DESCRIPTION OF DRAWINGS

Figure 6:
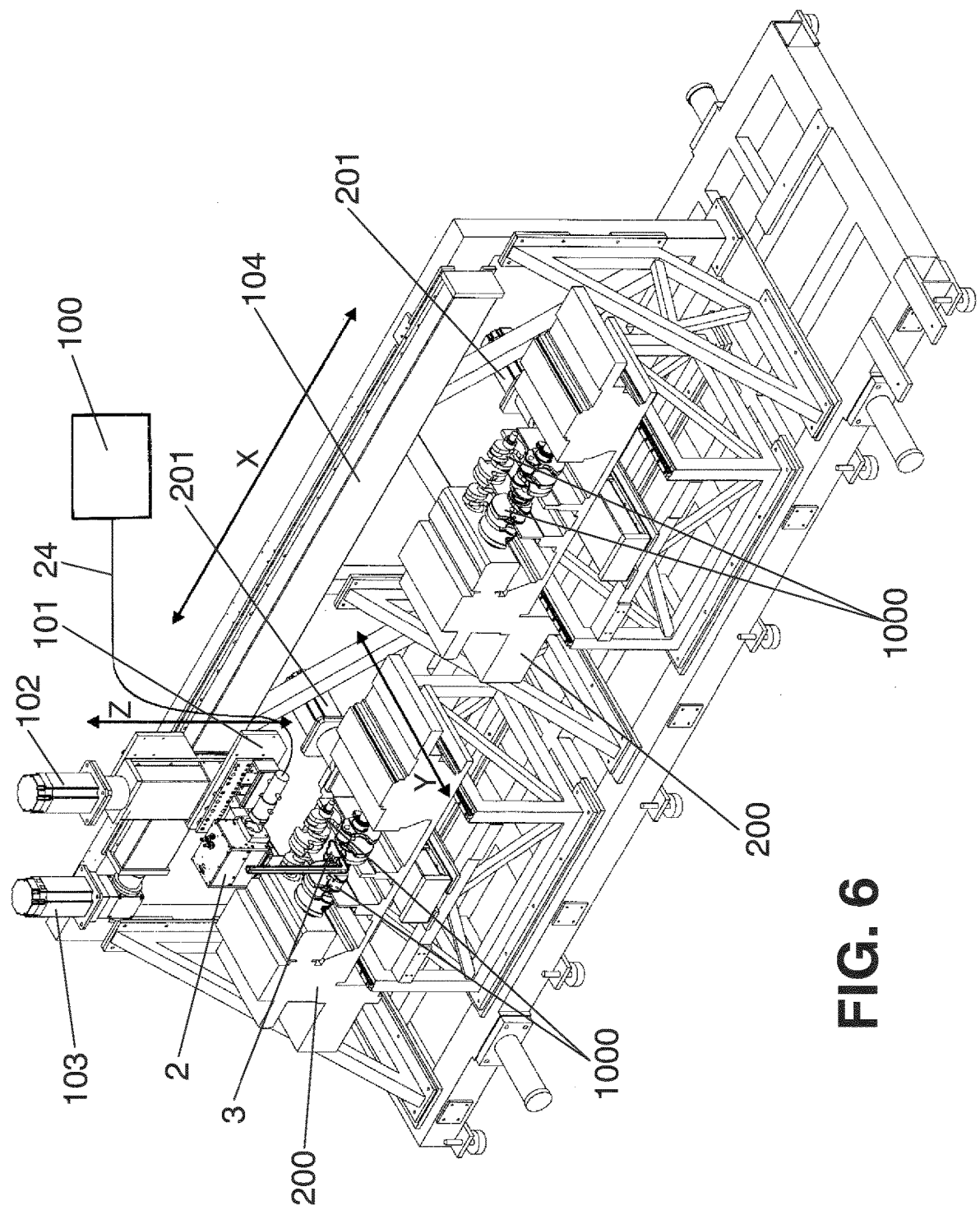
FIG. 6 is a schematic perspective view of a system or apparatus according to one possible embodiment of the disclosure.

FIG. 6 illustrates an apparatus in accordance with one possible embodiment of the disclosure. The apparatus comprises a frame structure accommodating a laser source (schematically illustrated at 100) which provides laser light via a light guide 24 to a scanner 2 mounted on a scanner carriage 101 which is displaceable in the vertical direction, in parallel with a vertical Z axis of the apparatus, by first scanner carriage drive means 102, for example, by a servomotor or any other suitable drive means. On the other hand, the scanner 2 can also be driven horizontally, in parallel with a horizontal X axis of the apparatus, along a horizontal track 104, driven by second scanner carriage drive means 103, such as another servomotor or other suitable drive means.

On the other hand, the apparatus comprises two workpiece carriages 200, each workpiece carriage being able to accommodate two workpieces 1000 in parallel (in this embodiment, the workpieces are crankshafts), and including drive means (not shown) for rotating each workpiece along a central axis (in this embodiment, the central axis corresponds to the longitudinal axis passing through the centers of the main journals of the crankshaft), said axis being in parallel with the X axis of the apparatus. On the other hand, each workpiece carriage 200 is associated with a workpiece carriage drive means 201 (such as a servomotor or any other suitable drive means) arranged to displace the workpiece carriage horizontally, in parallel with a Y axis of the apparatus, perpendicular to the X axis.

The references to the horizontal and vertical directions are only used to simplify the explanation, and any other orientation of the axes is obviously possible and within the scope of the disclosure.

In the present case, the laser source 100 and scanner 2 are first used to harden the relevant parts of the surface of one of the workpieces 1000 in a first one of the workpiece carriages 200, then they are used to harden the relevant parts of the surface of the other workpiece 1000 in said first one of the workpiece carriages 200, and then the scanner is moved along the track 104 to face the second one of the workpiece carriages 200, for hardening surfaces of the workpieces 1000 arranged therein. While the scanner 2 is operating on the workpieces in the second one of the workpiece carriages, the workpieces in the first one of the workpiece carriages can be unloaded and replaced by new workpieces to be treated by the scanner.

Obviously, there are many alternative possibilities. For example, there may be only one workpiece per workpiece carriage, or there may be more than two workpieces per workpiece carriage. There may be one scanner per workpiece carriage (that is, a second scanner carriage with its corresponding scanner can be added to the track 104). Also, several arrangements as the one of FIG. 6, or variants thereof, can be placed in parallel. Also, each scanner carriage 101 can be provided with more than one scanner 2, so that several workpieces in a workpiece carriage can be subjected to laser hardening treatment simultaneously. The relation between the number of scanners, the number of workpiece carriages, and the number of workpieces, can be chosen so as to optimize the use of the more expensive parts of the system, and to optimize productivity, for example, by allowing for loading and unloading of workpieces without stopping the operation of the system. In some embodiments of the disclosure, a plurality of scanners can be used to direct laser beams simultaneously to the same crankshaft, for example, to act simultaneously on different journals of the crankshaft or on the same journal of the crankshaft.

In some embodiments of the disclosure, during heat treatment of a rod journal 1002, the central axis of which is radially displaced from the central axis of the main journals, during rotation of the respective crankshaft workpiece 1000 in the work piece carriage 200, the scanner 2 is moved vertically in parallel with the Z axis and the workpiece carriage 200 is moved horizontally in parallel with the Y axis, so as to keep a constant distance between the scanner and the surface onto which the laser beam is projected. In other embodiments of the disclosure, the crankshafts can be moved in parallel with the Z and Y axes. Also, or alternatively, the scanner can be arranged to be moveable in parallel with the Z and Y axes.

The operation of the first 102 and second 103 laser carriage drive means, as well as the operation of the workpiece carriage drive means 201 and of the drive means for rotating the workpieces 1000 in the workpiece carriages 200, can be controlled by electronic control means such as a computer, computer system or PLC (not shown in FIG. 6).

The scanner includes elements for modifying the direction of the laser beam. Such scanners are well known in the art, and frequently include one or more scanning mirrors, the angles of which can be modified in accordance with scanning functions, such as sine functions, triangular functions, etc., under the control of a computer. A one-axis scanner (for example, a scanner with a scanning mirror pivotable about one axis, or similar) can be used to scan the laser beam in parallel with the X axis, that is, perpendicularly to the direction of movement of the surface of the workpiece 1000 relative to the scanner 2 due to the rotation of the workpiece 1000. A rapid scanning across the relevant portion of the surface can thus create a virtual spot having an extension in the X direction much larger than the extension of the spot without scanning: thus, the original spot is turned into a wider virtual or effective spot (with a larger extension in the X direction), but with a smaller power density, as the power of the beam is distributed over a larger area.

With a two-axes scanner (for example, with a scanner having a bi-axial mirror, or two uni-axial mirrors), the laser beam can be moved in two directions, for example, on the one hand in parallel with the X axis, and on the other hand in parallel with the Y axis, and combinations thereof. Thus, apart from scanning the surface perpendicularly to the direction of movement of the surface relative to the scanner, that is, apart from scanning the surface "along" the surface of the journals in the X axis direction, the laser beam can also scan the surface in the direction of its movement, that is, in parallel with the Y axis; thereby, the surface of a journal of a crankshaft can be scanned also in the circumferential direction of the journal. Also, the laser beam can describe paths that combine movement in the X direction and the Y direction (that is, when projected onto the circular journal of a crankshaft, in the circumferential direction). Thereby, the beam can follow paths having complex shapes, such as rectangles, ovals, trapezoids, etc. Thus, using the capacity of the scanner, a virtual or equivalent effective laser spot can be created, having a desired extension and shape, both in the X direction and in the Y or circumferential direction. In the case of a so-called XYZ-scanner, in addition to the possibility of movement in the X and Y directions, a focusing lens is provided which can be displaced in the Z direction by some kind of drive means, thereby allowing for dynamic adaptation of the size of the laser spot. Thereby, both the position of the spot and its size can be controlled and adapted to optimize the hardening process. Also, as an alternative or in addition to the displacement of a focusing lens or similar, the size of the laser spot can be controlled and adapted by moving the scanner in parallel with the Z-axis, using the first scanner carriage drive means. Also, the system can include means for varying the distribution of the power within the laser spot, as known from, for example, DE-3905551-A1 mentioned above.

If FIG. 6, the beam deflector device 3 has been schematically illustrated as being attached to the scanner. In other embodiments of the disclosure, the beam deflector device 3 is provided separately from the scanner, for example, provided with its own drive means to be positioned, for example, in synchronization with the scanner.

Figure 7:
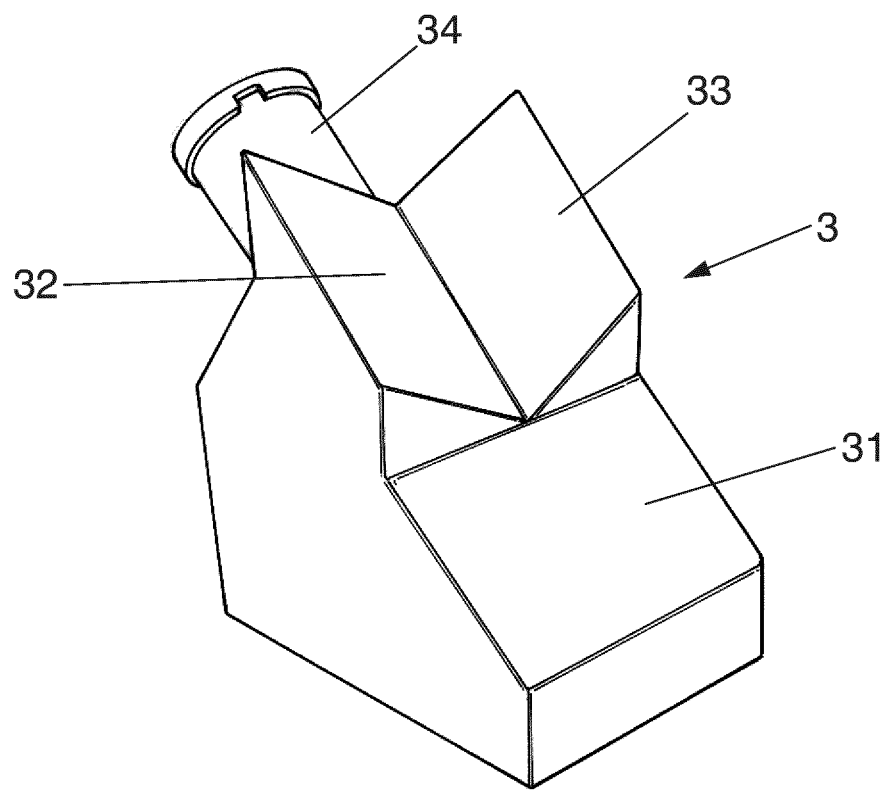
FIG. 7 is a perspective view of a beam deflector device according to a first embodiment of the disclosure.

FIG. 7 illustrates a beam deflector device 3 in accordance with one possible embodiment of the disclosure, in the form of a mirror with three different flat or substantially flat surface portions 31, 32, 33 arranged with differ spatial orientations, that is, at different angles in relation to, for example, the scanner. The mirror also includes at connection 34 to connect the beam deflector device to receive a cooling fluid.

Figure 8:
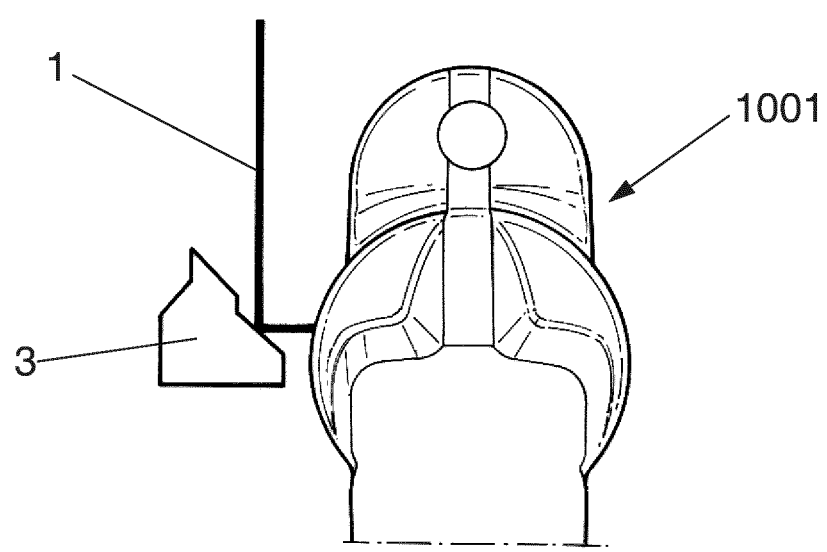
FIG. 8 is a side view showing how the beam deflector device of FIG. 7 can be arranged to redirect a beam towards a workpiece.

FIG. 8 is a side view schematically illustrating how a mirror 3 as the one of FIG. 7 can be placed below a scanner (not shown) to reflect and thereby redirect a beam 1 towards the workpiece 1000.

FIGS. 9A-9D show how the three different surface portions are used, in accordance with one embodiment of the disclosure, to redirect the beam to different portions of the crankshaft in the region of a journal 1001 to be heat treated by the beam, during one sweep of the primary spot along the first scanning pattern. In FIG. 9A it is shown how the scanner (not shown) directs the laser beam to project a primary spot on a surface of the crankshaft, via the beam deflector device. Here, the beam impinges on the upper right surface portion 33 of the mirror—as indicated by the arrow, which redirects the beam towards the left fillet 1004 of the journal and to the wall 1005. In FIG. 9B, it can be seen how the beam impinges on the lower surface portion 31 of the mirror, whereby the beam is redirected onto the surface of the journal. In FIG. 9C, the primary spot continues its movement along the first scanning pattern, still reflected by the lower surface portion 31 of the mirror, and thus still directed onto the surface of the journal. However, in FIG. 9D, the beam is reflected by the upper left surface portion 32 of the mirror, and thereby redirected towards the right fillet 1004 and wall 1005.

Figure 1:
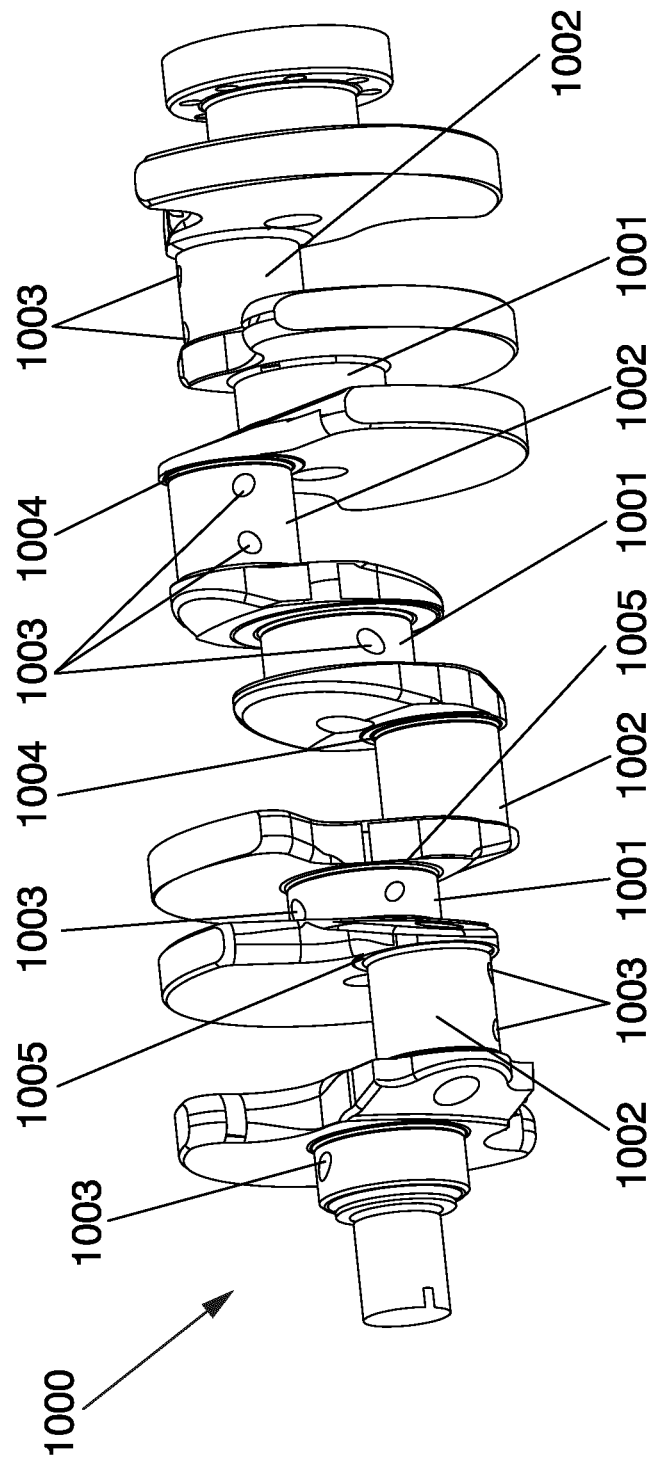
FIG. 1 is a schematic perspective view of a crankshaft, as known in the art.
Figure 2C:
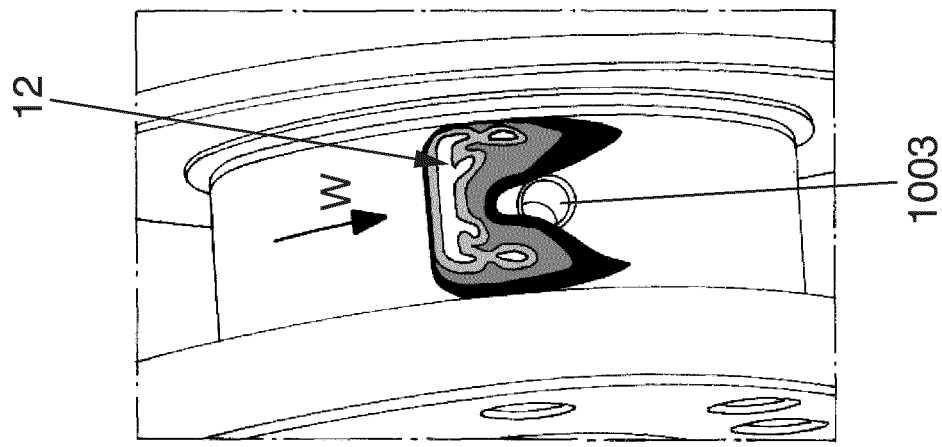
FIGS. 2A-2C schematically illustrate how the energy distribution of an effective laser spot is adapted when hardening the area around an oil lubrication hole, according to a prior art method known from WO-2014/037281-A2.
Figure 2B:
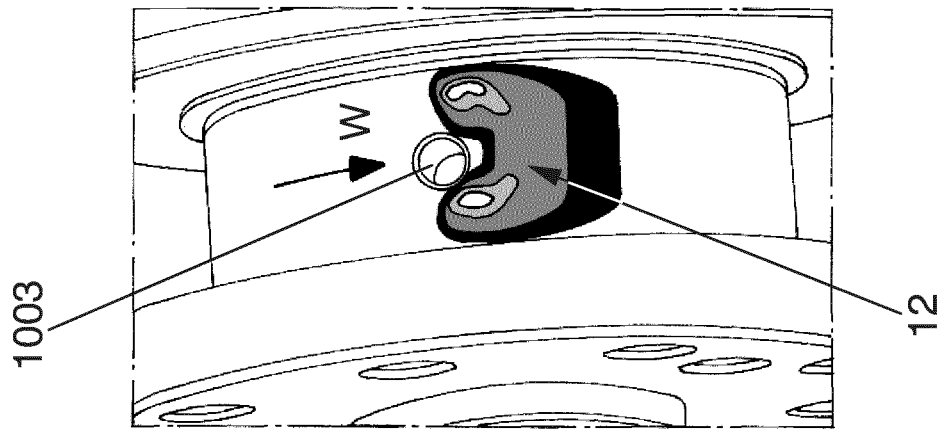
Figure 2A:
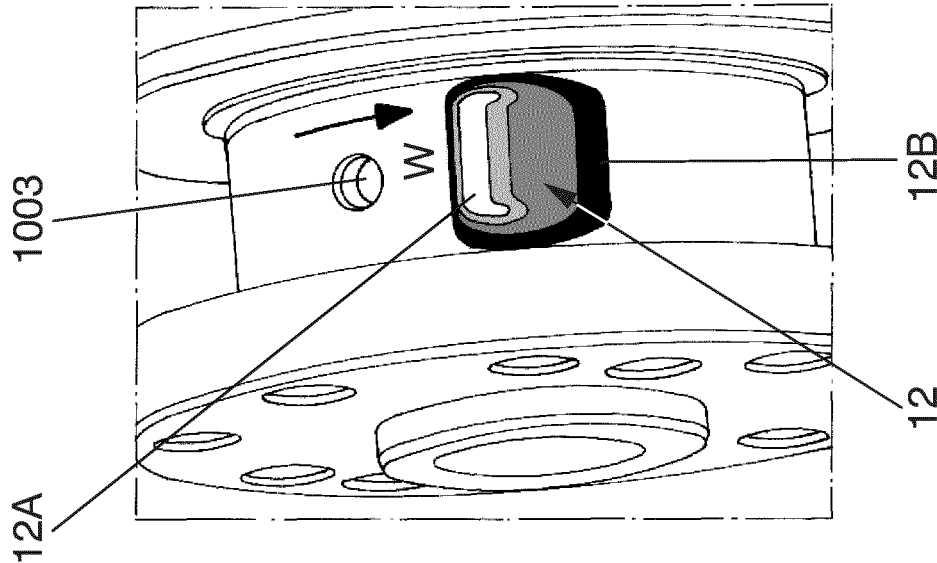
Figure 3:
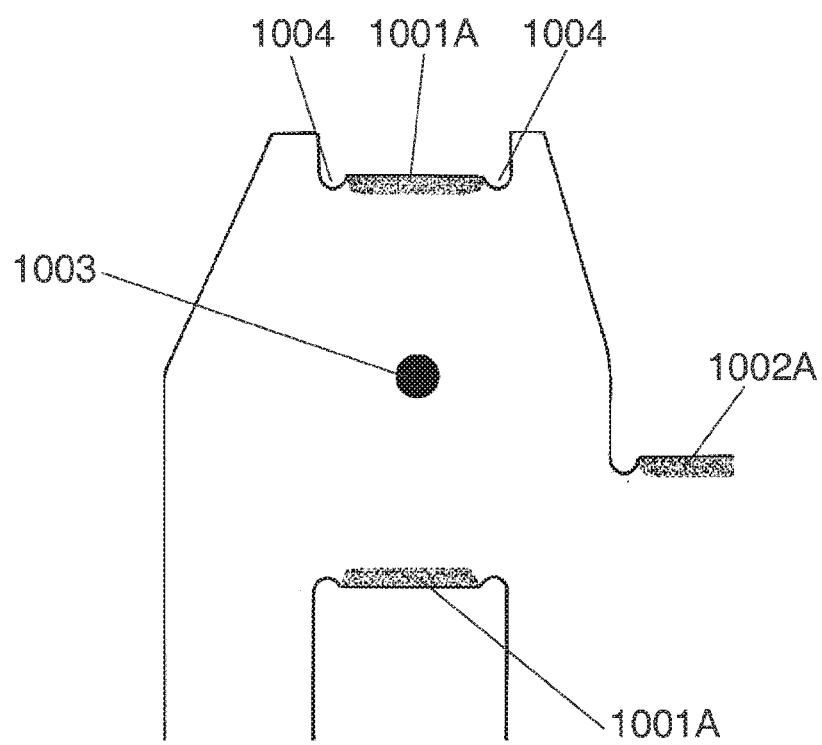
FIG. 3 is a schematic view of a cross-section along the longitudinal axis of two journals of a crankshaft after laser hardening of the surface of the journal between the fillets.
Figure 4:
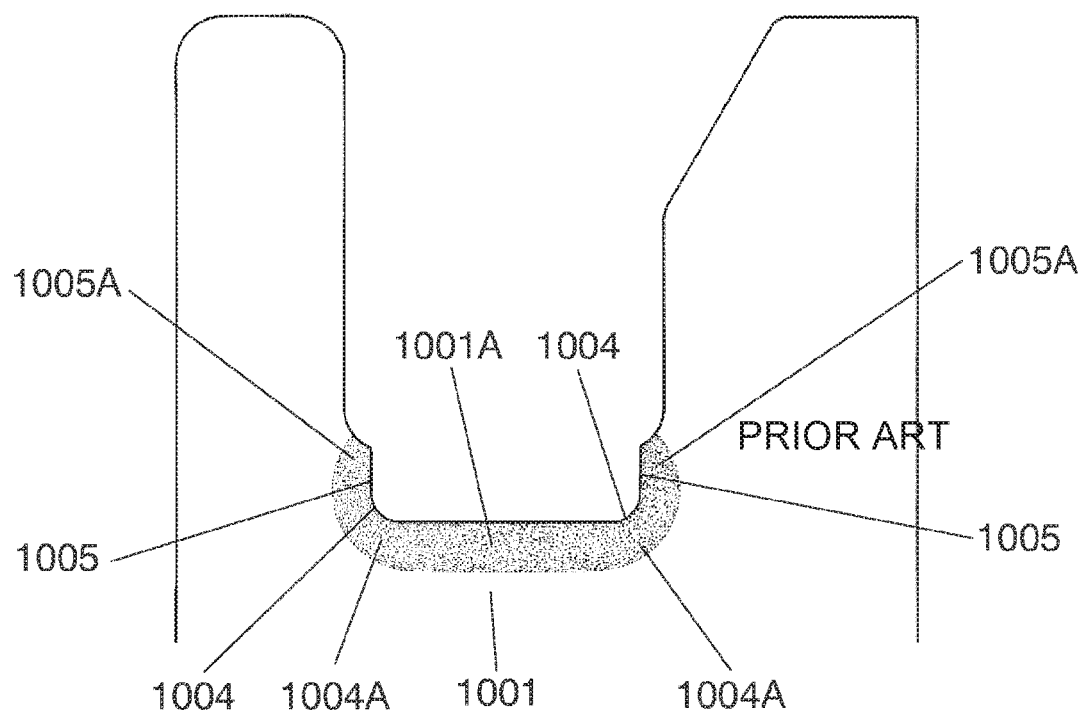
FIG. 4 is a schematic view of a cross-section along the longitudinal axis of two journals of a crankshaft, after laser hardening of the surface extending from a point above one of the fillets, along the journal, to a point above the other fillet.
Figure 5:
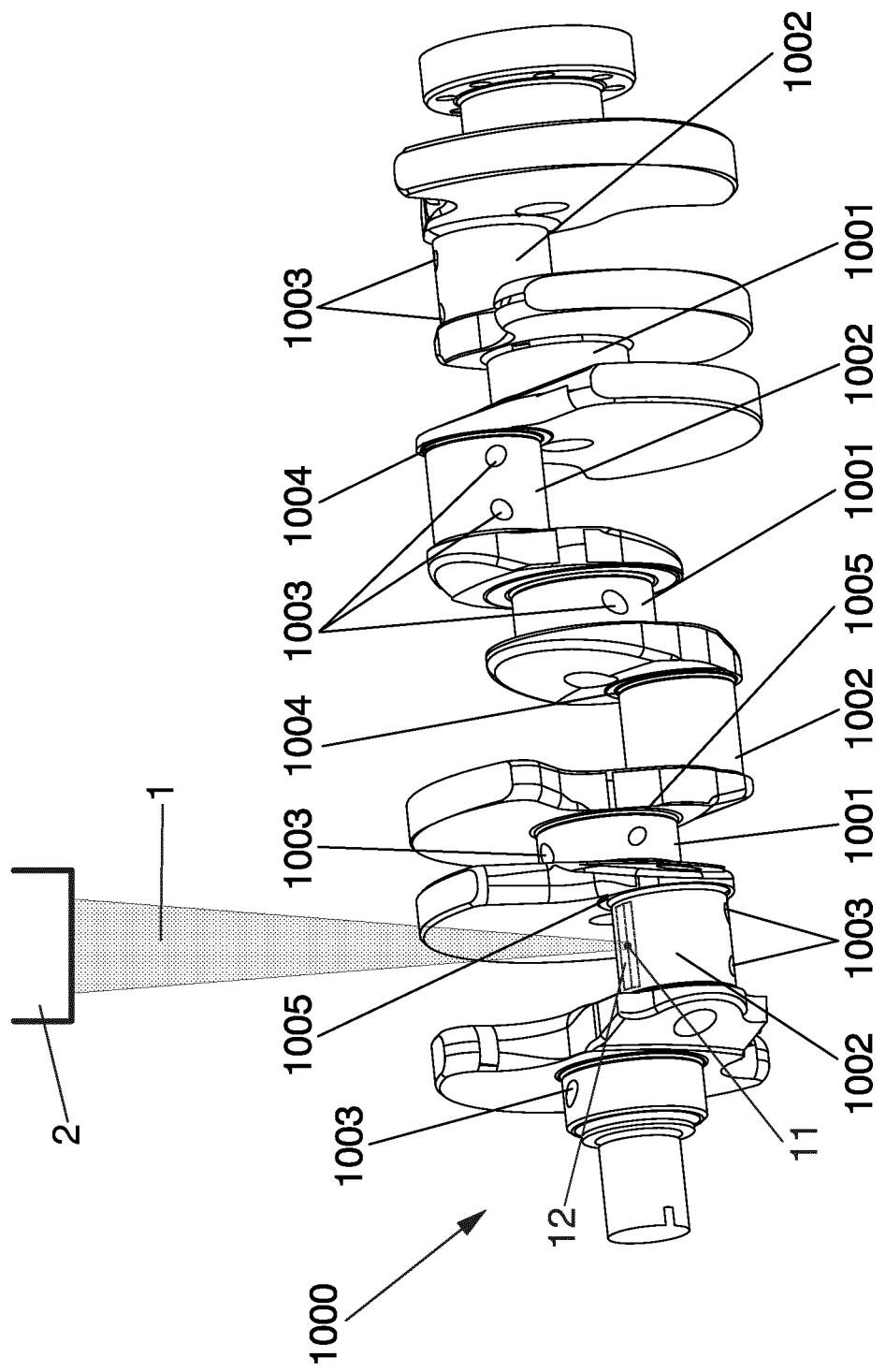
FIG. 5 is a schematic perspective view of a crankshaft onto which a laser beam is projected in line with the teachings of WO-2014/037281-A2, creating an effective laser spot by scanning a primary spot along a scanning pattern.

From FIGS. 9A-9D it can easily be understood how during one single sweep of the primary spot along the first scanning pattern, by appropriate operation of the scanner, the beam can impinge on the surface of the journal 1001, on the fillets 1004 and also on adjacent portions of the walls 1005, at a relatively large angle (such as about 45 degrees or more), substantially larger than the angle with which a beam as per FIG. 5 would impinge on the walls. Obviously, the arrangement of FIGS. 9A-9D imply that there will be jumps in the first scanning pattern (for example, between FIGS. 9A and 9B, from the left portion of the journal to the right one), but this is also true for many other scanning patterns, including many of those known from WO-2014/037281-A2.

As in WO-2014/037281-A2, the first scanning pattern can be dynamically adapted during displacement of the effective spot along the circumference of the journal, so that the two-dimensional energy distribution is different in the presence of an oil lubrication hole 1003 than when no such oil lubrication hole is present in the area being heated by the effective spot.

FIG. 10 schematically illustrates another embodiment of the beam deflector device 3A, here with an elongated mirror surface 35 having a cross section corresponding to a segment of a circle or similar. An advantage with this kind of continuous mirror surface (that is, without the discontinuities that are present in the mirror 3 of FIG. 7 between the three surface portions 31, 32 and 33) is that sudden jumps or discontinuities in the direction of the beam can be avoided. However, the curved surface of the mirror 3A tends to deform the shape of the primary spot, which in some cases may be a disadvantage.

Obviously, the beam deflector device can be configured in an infinite number of ways, for example, combining planar and curved surface portions and/or combining surface portions having different and/or variable curvatures. The skilled person will be able to choose an appropriate geometry of the beam deflector device, taking into account, for example, the particularities of the object to be treated.

Figure 11A:
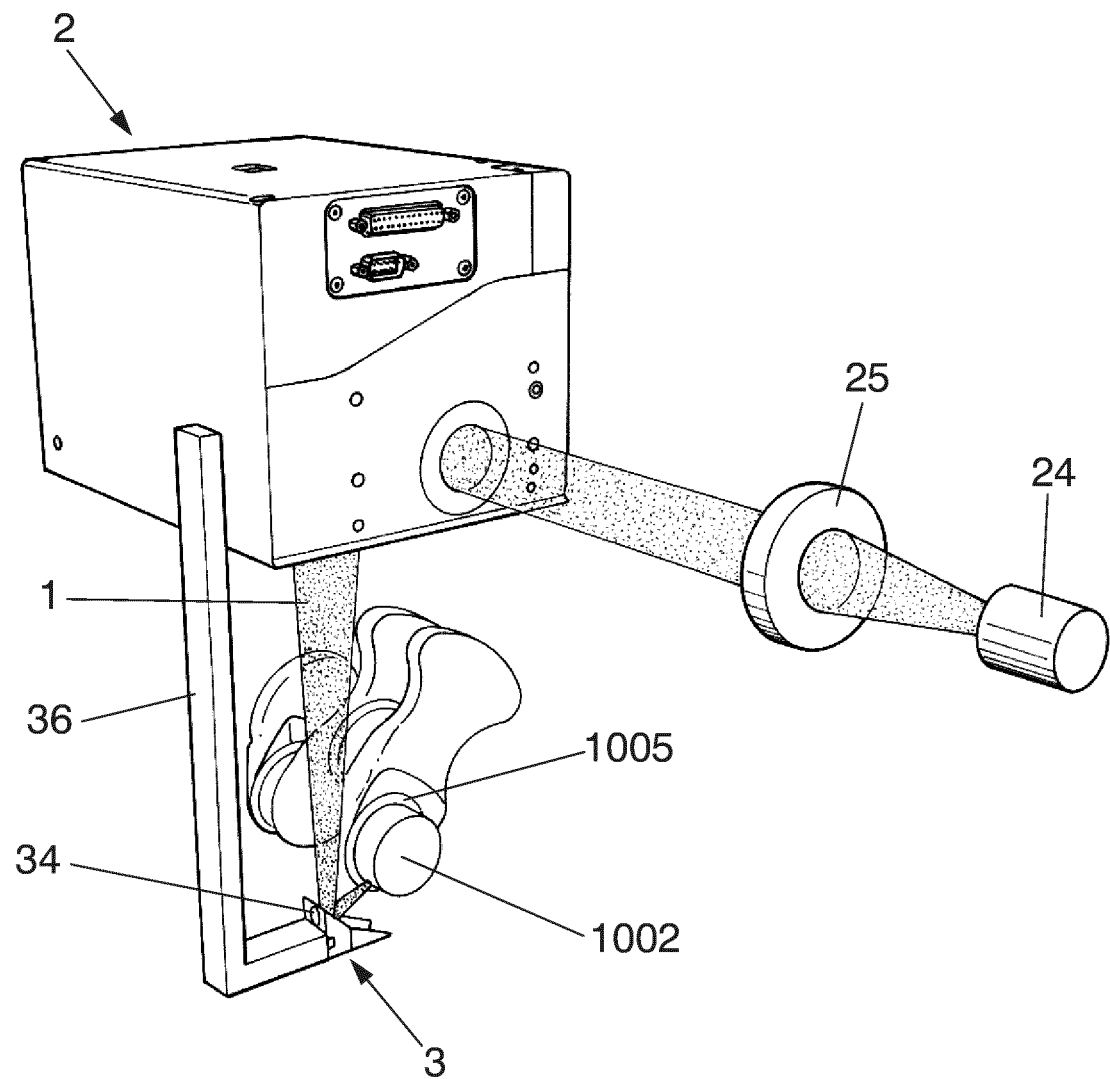
FIGS. 11A and 11B are schematic perspective views of part of an apparatus in accordance with another embodiment of the disclosure.
Figure 11B:
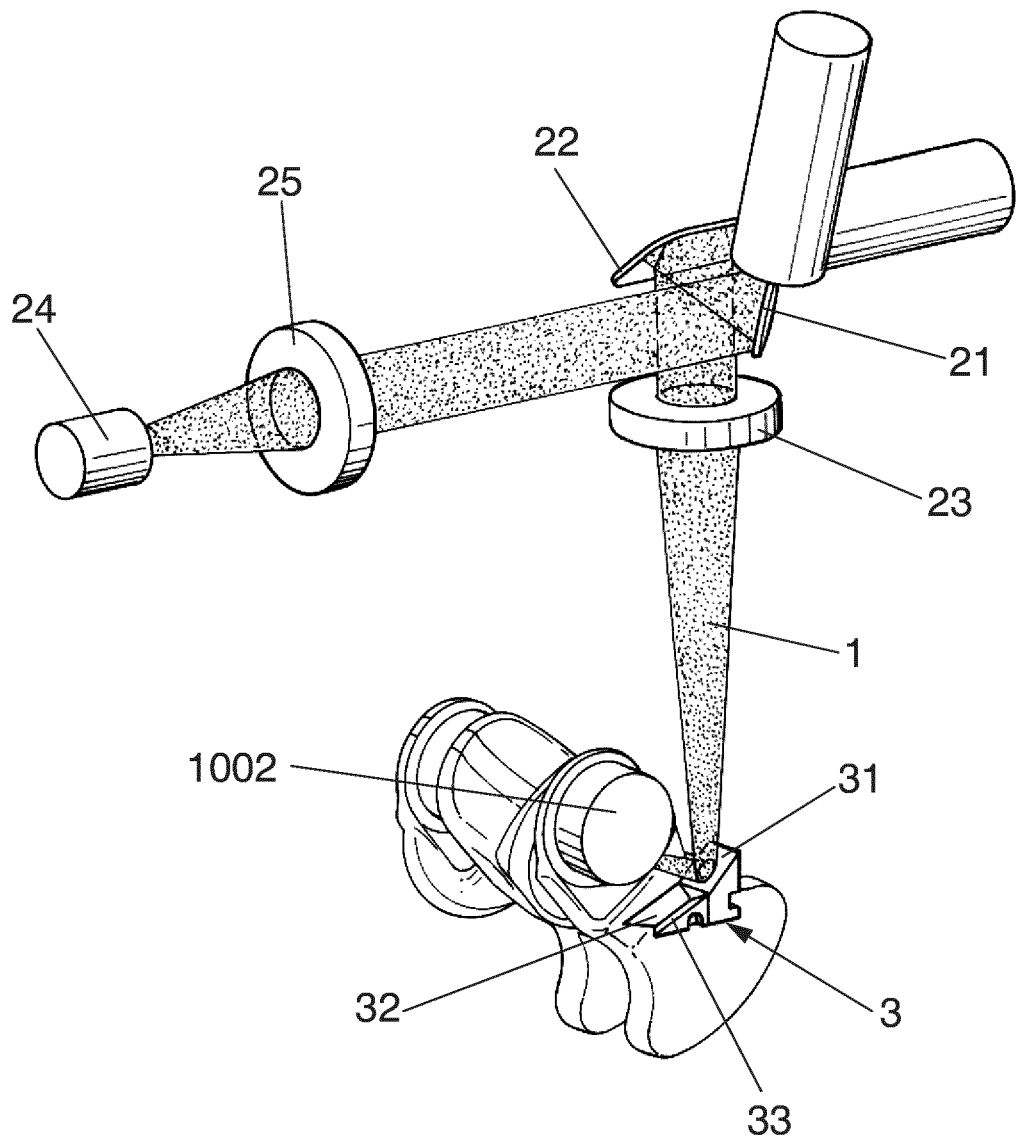

FIGS. 11A and 11B illustrate an alternative embodiment of the disclosure, in which a beam deflector device 3 similar to the one of FIG. 7 is used, but with the broader surface portion 31 placed above the two narrower surface portions 32 and 33. In FIG. 11A it is shown how the beam deflector device 3 is attached to the scanner 2 by means of a simple L-shaped attachment device. Any other suitable attachment device can be used, and in other embodiments of the disclosure the beam deflector device can be separate from the scanner, attached to another part of the system, for example, to separate drive means to displace the beam deflector device in synchronism with the scanner 2. If FIGS. 11A and 11B it can be seen how a schematically illustrated laser source 24 provides a laser beam 1 which, after passing through a collimating lens 25, passes through the scanner 2 where two scanning mirrors 21 and 22 (shown in FIG. 11B) are used to scan the laser beam 1 in two dimensions. From the scanning mirrors, the laser beam is directed through a focusing lens 23 and onto the beam deflector device 3, which has three reflective surface portions 31, 32 and 33. The beam deflector device reflects the beam 1 onto a surface portion of a crankshaft in order to heat said portion for hardening. In this case, the portion corresponds to a rod journal 1002.

Figure 12A:
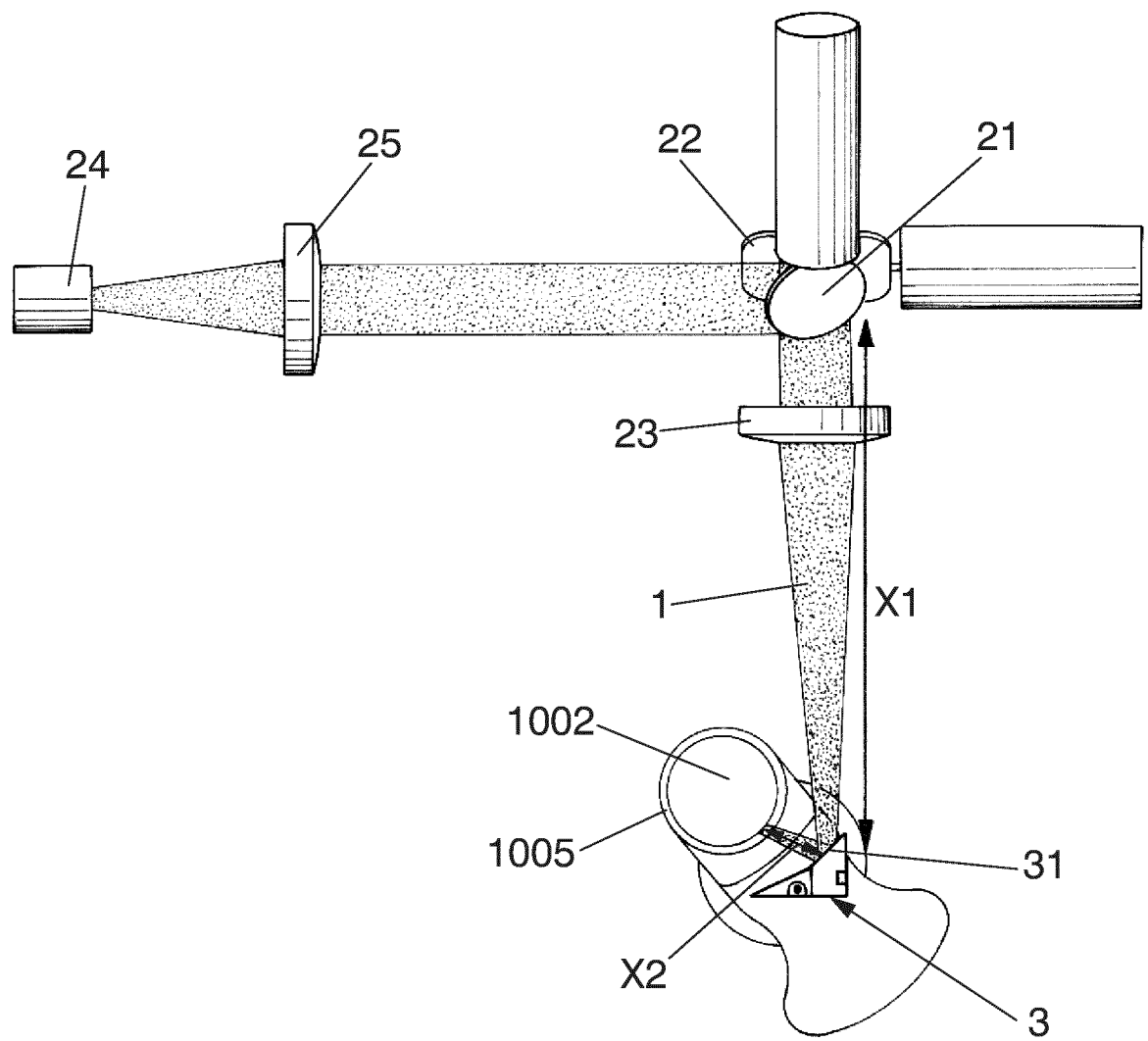
FIGS. 12A and 12B are schematic side views of part of the apparatus in accordance with this embodiment of the disclosure, during two different stages of a scan of the primary spot along the first scanning pattern.
Figure 12B:
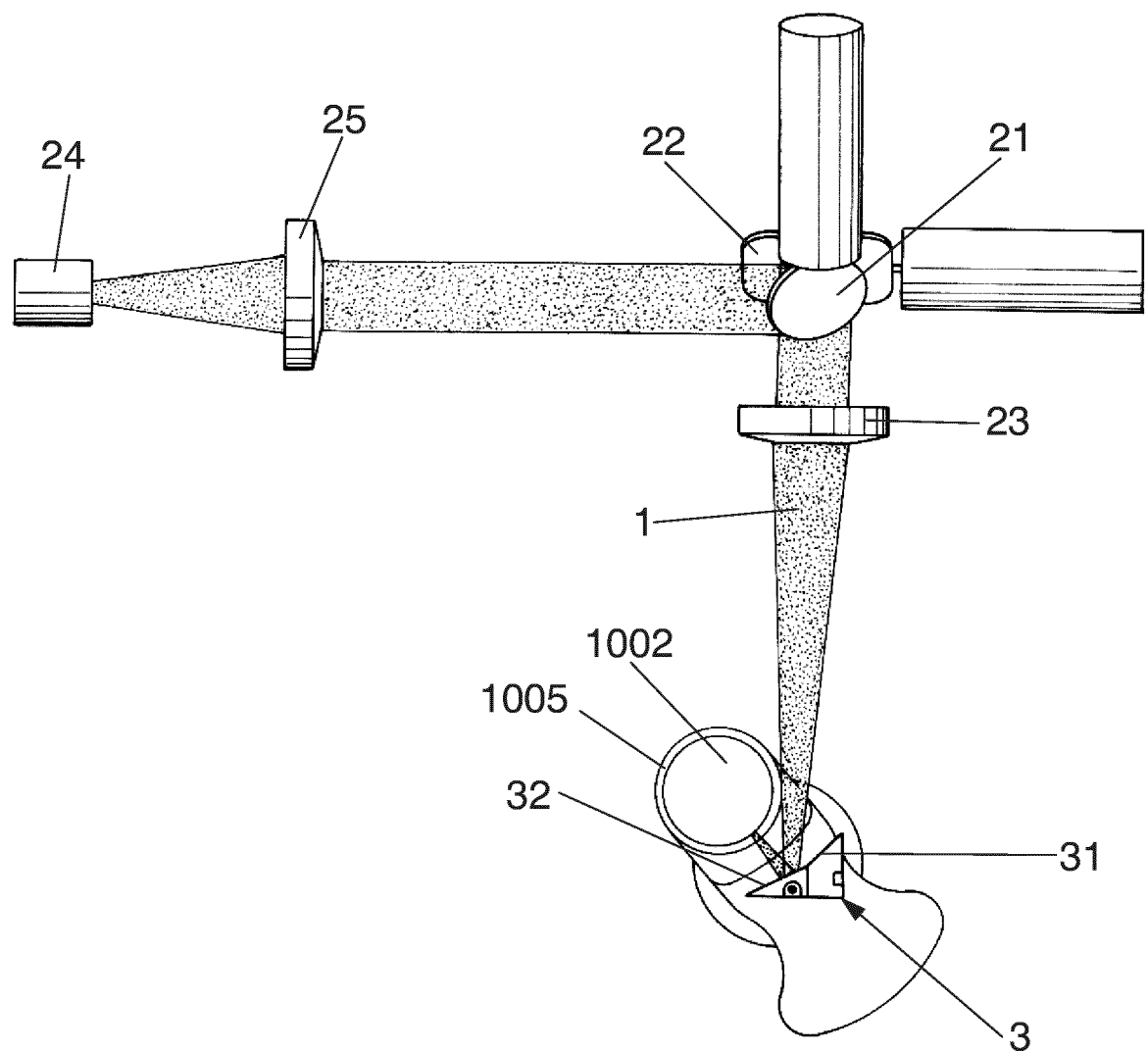
Figure 13A:
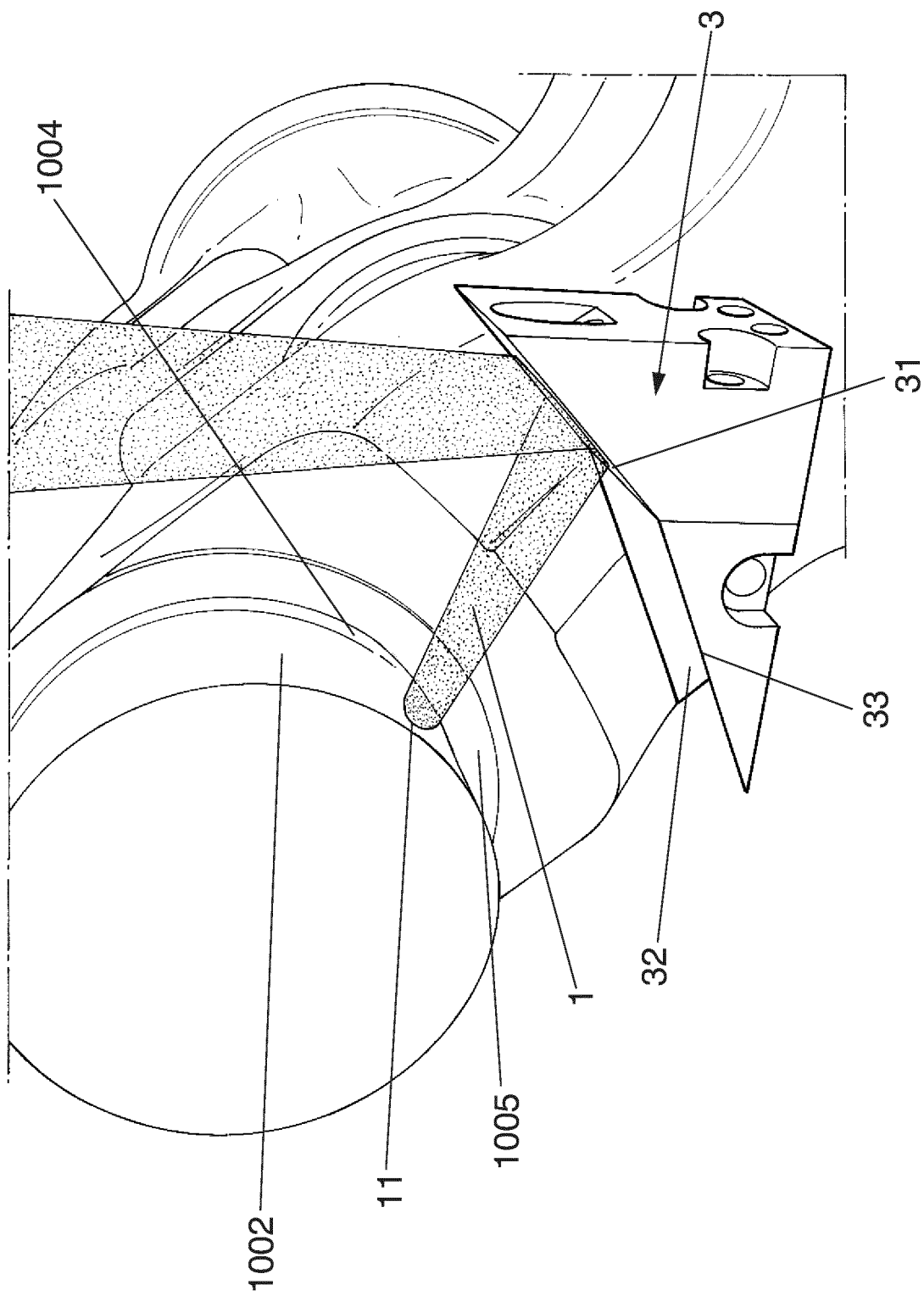
FIGS. 13A and 13B are schematic perspective views of a detail of the apparatus during the stages shown in FIGS. 12A and 12B, respectively.
Figure 13B:
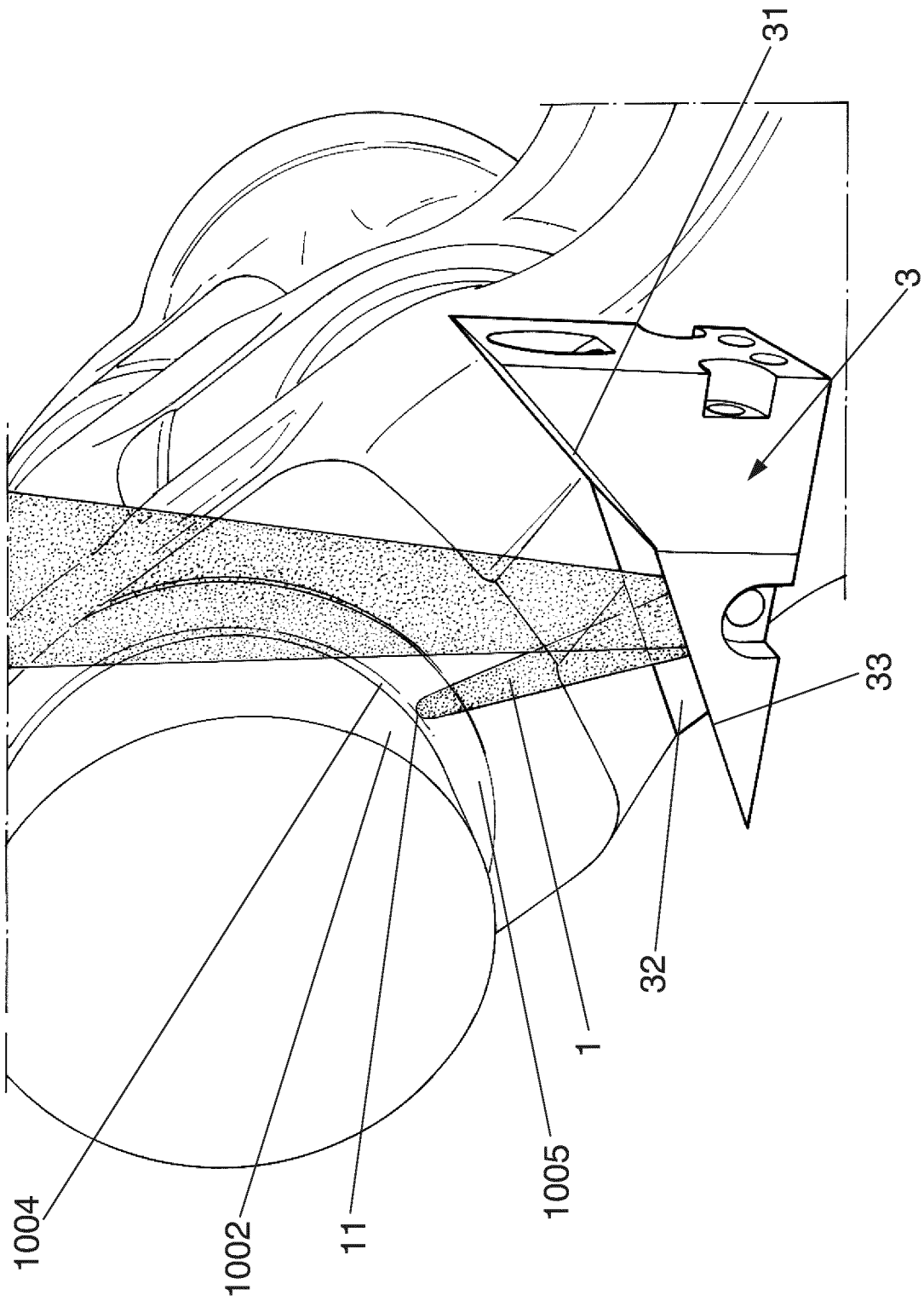

The laser beam is scanned in accordance with a beam scanning pattern and reflected by the beam deflector device so that the projected primary spot follows an appropriate first scanning pattern on the surface of the workpiece. In FIGS. 12A and 13A it can be seen how, during the scanning of the beam, at one stage of the process the beam is directed onto the surface portion 31 of the beam deflector device, from which the beam is reflected onto the surface of the journal, so that the primary spot 11 moves along and/or across the surface of the journal 1002. In FIGS. 12B and 13B, the beam 1 has reached the surface portion 32, so that it has been redirected towards the fillet 1004 and side wall portion 1005, thereby heating these portions. Thus, during one sweep of the beam along the beam scanning pattern, the primary spot 11 is moved along the first scanning pattern, heating both a portion of the journal 1002 and a portion of the fillets 1004 and walls 1005 at both ends of the journal.

It is easily understood from this description and from, for example, FIGS. 11A-13B, that with an appropriately placed beam deflector device 3, the beam will always reach the corresponding surface portions (journal, fillet, wall) at an angle of, for example, between 45 degrees and 90 degrees. For example, it can be preferred that the mirror is arranged at a distance from the journal that is in the order of the width of the journal, preferably not larger than said width, or not larger than 1.5 times said width or two times said width.

In FIG. 12A, a first part X1 of the optical path (between the last mirror 22 of the scanner or the focusing lens 23 of the scanner one the one hand, and the surface of the beam deflector device on the other) and a second part X2 of the optical path (between the surface of the beam deflector device 3 and the primary spot projected on the surface of the objet to be treated) have been indicated. Typically, first part X1 is substantially larger than the second part X2, such as more than twice X2. For example, in the case of the hardening of crankshafts for vehicles such as automobiles, X1 can typically preferably be chosen in the range of from 200 mm to 1000 mm or more, whereas X2 is typically in the range from 10 mm to 100 mm.

It is also clear from the above that the first scanning pattern, that is, the scanning pattern that the primary spot 11 follows on the surface of the object, can differ substantially from the scanning pattern followed by the beam before the beam deflector device.

Figure 14:
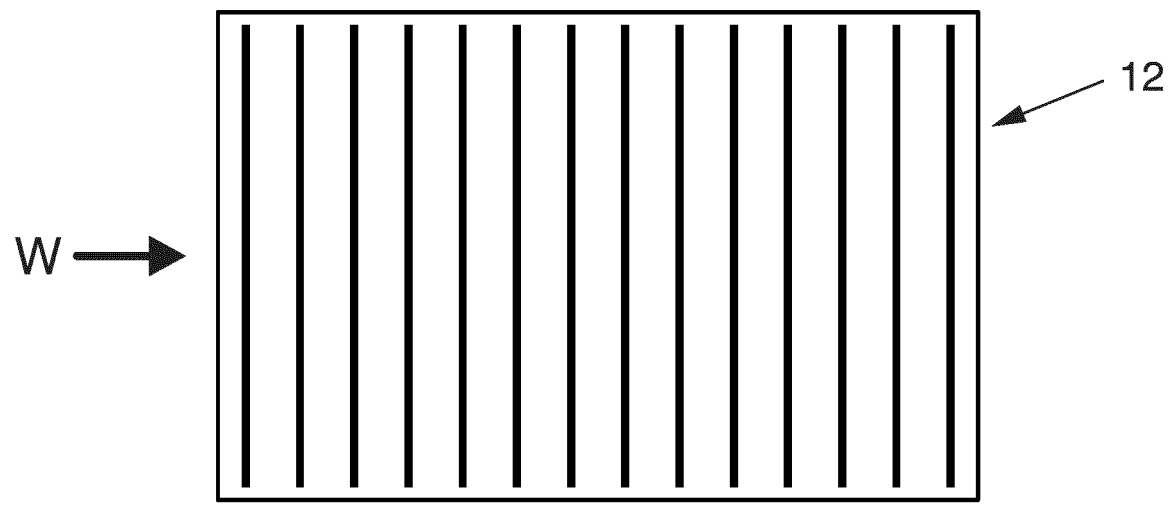
FIG. 14 schematically illustrates an effective laser spot created by a scanning pattern comprising a plurality of parallel lines.

As explained above, for a given size of the primary spot, a substantial extension of the effective spot in the direction of travelling can be achieved by providing a scanning pattern comprising more than two lines arranged after each other in the direction of travelling, such as schematically illustrated in FIG. 14, wherein the effective laser spot 12 is created by a plurality of parallel lines, extending in a second direction perpendicular to a first direction of relative movement between the effective laser spot and the surface area being treated (for example, in the embodiments described above, the first direction can be the circumferential direction W of a surface of a journal of a crankshaft).

Such a scanning pattern can be created by repetitively scanning the primary spot in a second direction perpendicular a first direction in which the effective spot is travelling, displacing the beam a small distance in the first direction between each scanning step, so as to trace a plurality of parallel lines. Once the primary spot has completed the scanning pattern, it will return to its original position and carry out the scanning pattern once again. The frequency with which this occurs is preferably high, so as to avoid undesired temperature fluctuations within the effective spot 12.

Depending on the design of the beam deflector device, for example, on the shape of its surface and on the whether there are discontinuities in said surface, the beam scanning pattern followed by the beam before the beam deflector device may differ more or less from the first scanning pattern followed by the primary spot on the surface of the object.

The laser beam can be switched off while it is being displaced towards a new line to be followed, and/or between finishing the last line of the scanning pattern and returning to the first line of the scanning pattern. However, switching laser beams on and off requires time, and can slow down the scanning frequency. Also, the time during which the laser beam is switched off is time that is lost in terms of efficient use of the laser for heating.

Figure 15A:
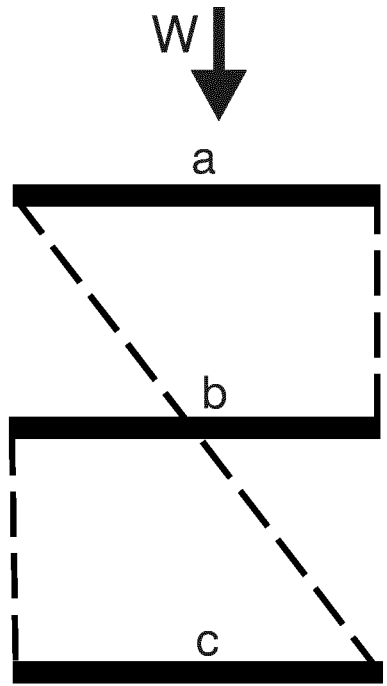
FIGS. 15A and 15B illustrate one possible beam scanning pattern comprising a plurality of parallel lines.
Figure 15B:
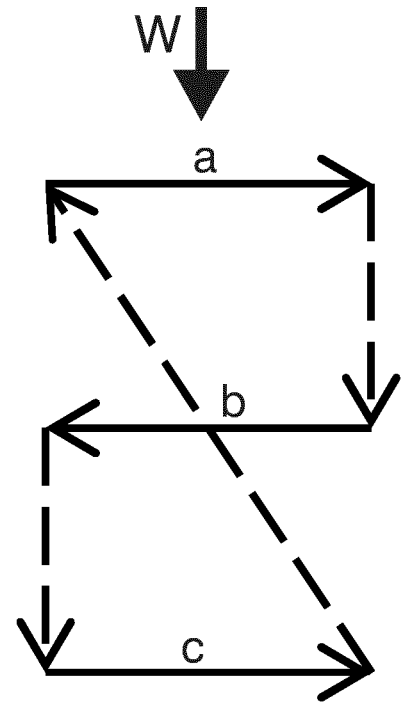

FIGS. 15A and 15B illustrates one possible beam scanning pattern comprising three main lines a-c (illustrated as continuous lines) of the scanning pattern, and hatched lines illustrating the path which the laser spot or beam follows between said lines. In FIG. 15B, the arrows schematically illustrate the way in which the actual laser spot/beam travels over the surface to be hardened while following the scanning pattern.

Now, this scanning pattern involves a problem in that if this is the scanning pattern followed by the primary spot, the heat distribution will not be symmetric. The same applies if, at the end of the pattern, when finishing the last line c (that is, from the head of the arrow of line c in FIG. 15B), the laser beam returns vertically to line a.

Figure 16A:
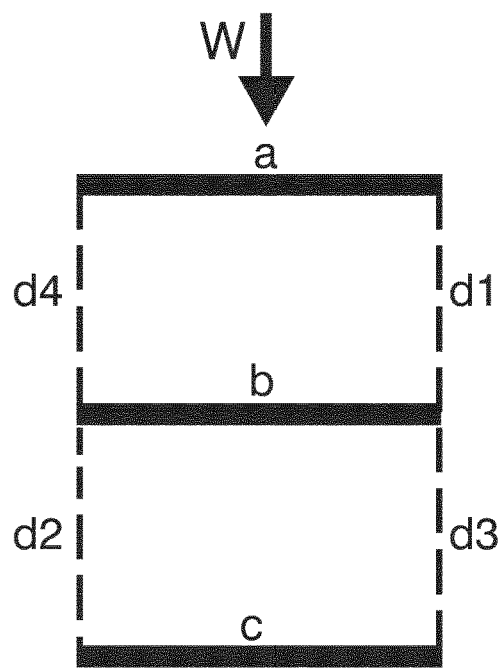
FIGS. 16A and 16B illustrate a beam scanning pattern for creating an effective laser spot in accordance with an embodiment of the disclosure.
Figure 16B:
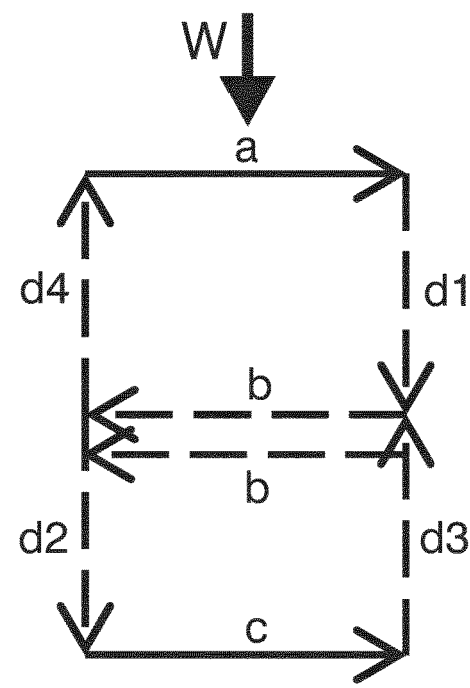

A more symmetrical energy distribution with regard to the W axis can be obtained with a scanning pattern as per the one of FIGS. 16A and 16B, likewise comprising three parallel lines a-c interconnected by the lines d followed by the actual laser spot when moving between these lines. As illustrated in FIG. 16B, the laser beam, from the beginning of the first line a, travels as follows: a-d1-*b*-d2-*c*-d3-*b*-d4.

That is, the spot travels along the intermediate line b twice as often as it travels through the first line and the last line: it travels along the intermediate line b twice for each time it travels along the first line a and the last line c. Thereby, a completely symmetrical scanning pattern can be obtained, in relation to the W axis, that is, for example, in relation to the circumferential direction of the journal of a crankshaft.

The energy distribution along the W axis can be set by adjusting, for example, the distance between the lines a-c and the speed with which the laser beam or spot travels along the lines. By adjusting the speed and/or scanning pattern, the energy distribution can be dynamically adapted without turning the laser beam on and off or without substantially modifying the power of the laser beam. Thus, tailoring of the energy distribution can be achieved by adapting the distribution of the lines, such as the first, last and intermediate lines a-c, and by adapting the velocity of the beam along the different segments a-d (including d1-d4) of the scanning pattern. The distribution of the segments and the velocity of the segments can be dynamically modified while the effective laser spot is travelling along the surface area to be hardened, such as around a journal of a crankshaft, so as to adapt the energy distribution to avoid overheating of more heat sensitive subareas, such as subareas adjacent to oil lubrication holes or a previously hardened area that the effective laser spot approaches at the end of its travelling around the circumference of a surface area to be hardened, such as the surface of a journal of a crankshaft. Also, the scanning pattern can be adapted by adding or deleting segments during the travelling of the effective laser spot along the surface are to be hardened.

Figure 17A:
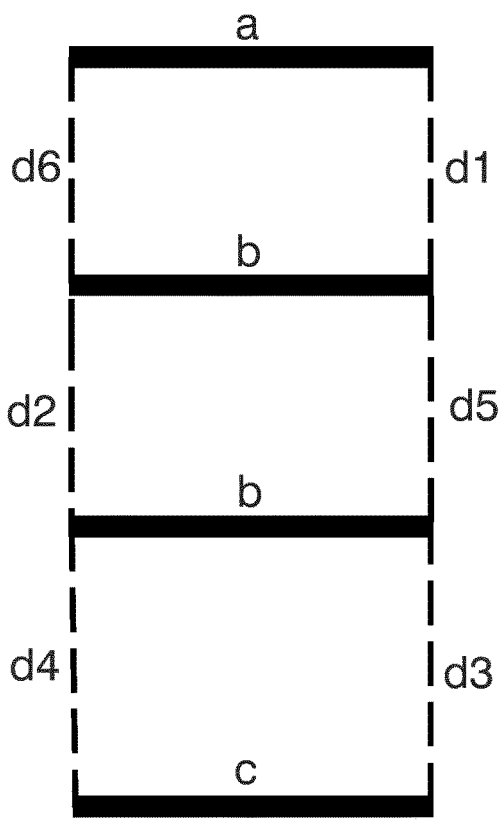
FIGS. 17A and 17B illustrate a beam scanning pattern for creating an effective laser spot in accordance with another embodiment of the disclosure.
Figure 17B:
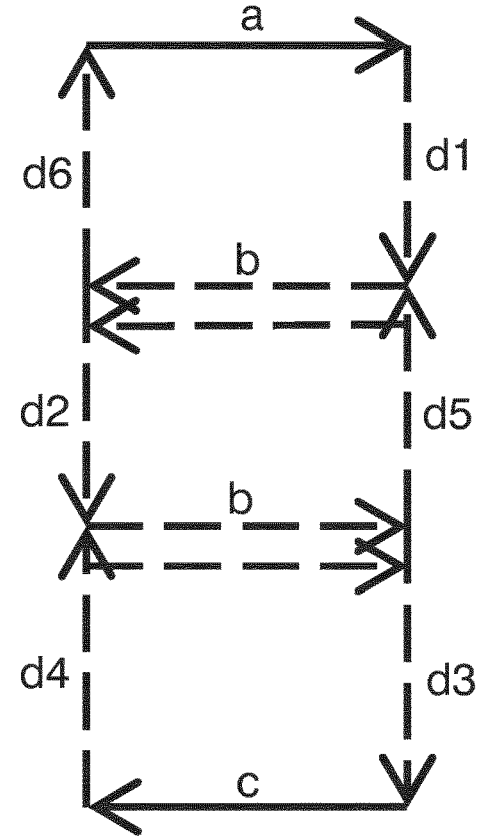

The same principle can be applied to other scanning patterns, such as the scanning pattern of FIGS. 17A and 17B, which includes an additional intermediate line b. Here, the path followed by the actual laser spot s: a-d1-*b*-d2-*b*-d3-*c*-d4-*b*-d5-*b*-d6.

As indicated above, the beam scanning pattern and the first scanning pattern may be different, as the first scanning pattern is determined not only by the beam scanning pattern but also by the beam deflector device. The first scanning pattern can be designed to optimize the energy distribution, and the first scanning pattern is sometimes determined by the capacity of the equipment used, for example, the capacity of the scanner. As explained above, sometimes it can be advantageous to operate with a scanning pattern that allows the beam to be kept in an "on" state all throughout the operation, to make efficient use of the capacity of, for example, the laser equipment used. The present disclosure represents a useful tool for the person skilled in the art, who can design an appropriate beam deflector device and/or the beam scanning pattern considering aspects such as the desired result in terms of the first scanning pattern, the capacity of the scanner, the capacity of the laser equipment used, etc.

Figure 18:
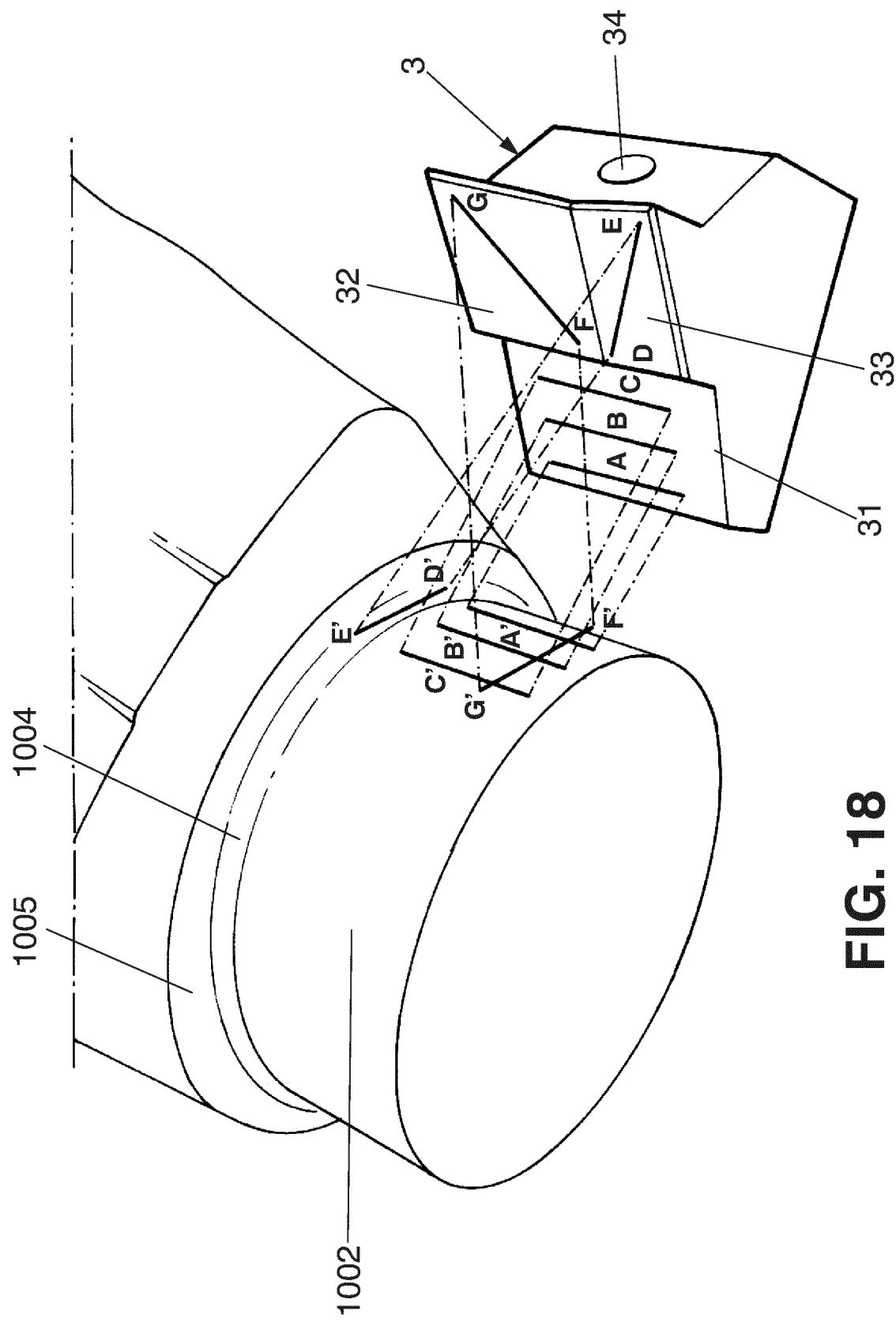
FIG. 18 schematically illustrates the relationship between the beam scanning pattern and the first scanning pattern in accordance with one possible embodiment of the disclosure.

FIG. 18 schematically illustrate the relation between the beam scanning pattern and the first scanning pattern in an embodiment using a beam deflector device 3 as shown in FIG. 7. In the embodiment of FIG. 18, the beam is scanned in two dimensions to heat not only the surface of the journal 1002 as such, but also surface in correspondence with the fillet 1004 and the wall 1005 just beyond the fillet. This is achieved by a beam scanning pattern that is illustrated by segments A, B, C, D-E and F-G on the beam deflector device 3. The first three segments are three parallel lines A, B and C projected on the surface portion 31 of the mirror 3, whereas segment D-E is projected on surface portion 33 and segment F-G on surface portion 32. The beam is reflected onto the crankshaft, whereby the primary spot follows a scanning pattern on the crankshaft comprising five lines, that is, segments A', B' and C' that extend along the surface of the journal as such, in parallel with the longitudinal axis of the journal, and two segments D'-E' and F'-G' which extend perpendicularly to the first three segments, and basically follow the circumferential direction of the journal, in correspondence with a respective fillet 1004 and wall 1005.

This is just an example and the person skilled in the art can obviously use the teachings provided by the present disclosure and select the scanning pattern and the beam deflector device that best corresponds to the specific purpose to be achieved. Also, in some embodiments of the disclosure, the skilled person can, for example, combine the use of the beam deflector device with direct irradiation. For example, the beam can be scanned so that part of the first scanning pattern corresponds to direct irradiation of the surface, that is, without deflecting the beam using the beam deflector device, and so that another part of the first scanning pattern corresponds to a deflected beam. For example, in some embodiments of the disclosure, a journal of a crankshaft can be heated by directing the beam directly onto the journal, whereas the wall portions adjacent to the fillets, and/or the fillets, can be heated during another portion of the first scanning pattern where the beam is directed onto the beam deflector device and redirected by it.

Although the disclosure has been described with reference to a specific product, namely, a crankshaft, this is just an example and the disclosure is obviously not limited to this specific use. However, the disclosure may be especially useful in the context of products featuring complex surfaces with portions oriented at substantially different angles in relation to the position of the scanner.

The invention claimed is:

1. A method for heat treatment of a crankshaft of a ferrous material, the method including the following steps: heating at least one selected portion of the crankshaft by:
projecting a laser beam onto a surface of the crankshaft so as to produce a primary spot on the surface of the crankshaft,
operating a scanner so as to repetitively scan the beam in two dimensions to displace the primary spot in accordance with a first scanning pattern, the first scanning pattern being a two-dimensional scanning pattern, so as to establish an effective spot on the surface of the crankshaft, said effective spot having a two-dimensional energy distribution,
and displacing said effective spot in relation to the surface of the crankshaft to progressively heat the at least one selected portion of the crankshaft,
wherein the beam follows an optical path between the scanner and the primary spot,
and wherein a beam deflector device is downstream from the scanner and placed in the optical path between the scanner and the primary spot to receive a two-dimensional beam scanning pattern according to which the beam is scanned by the scanner and redirect the beam onto the surface of the crankshaft,
and in that the beam deflector device is positioned such that at least at some moments the beam deflector device is placed between two walls or counterweights of the crankshaft.

2. The method of claim 1, wherein the optical path comprises a first part extending between the scanner and the beam deflector device, and a second part extending between the beam deflector device and the primary spot, said second part being smaller than said first part.

3. The method of claim 1, wherein the beam deflector device is a mirror.

4. The method of claim 3, wherein the beam deflector device comprises a plurality of regions, and wherein the step of operating the scanner comprises directing the beam to at least two different regions of said plurality of regions, each of said plurality of regions corresponding to at least one part of said first scanning pattern.

5. The method of claim 3, wherein the mirror comprises at least three different surface portions with different spatial orientations.

6. The method of claim 5, wherein said three different surface portions comprise a first surface portion, a second surface portion, and a third surface portion, the method comprising using the first surface portion for directing the beam towards a journal of the crankshaft, using the second surface portion for directing the beam towards a fillet and/or wall at a first end of the journal, and using the third surface portion for directing the beam towards a fillet and/or wall at a second end of the journal.

7. The method of claim 6, wherein the second surface portion and the third surface portion are arranged facing each other at an angle of more than 100 degrees and less than 170 degrees.

8. The method of claim 3, wherein the mirror comprises at least one curved portion for deflecting the beam.

9. The method of claim 1, wherein the beam deflector device and the scanner are displaced in synchronization with each other.

10. The method of claim 1, wherein the beam deflector device is static in relation to the scanner.

11. The method of claim 1, wherein the effective spot is displaced in relation to the surface by rotating the crankshaft.

12. The method of claim 1, wherein said two-dimensional energy distribution is dynamically adapted during displacement of said effective spot, so as to avoid overheating of a more heat sensitive subarea.

13. The method of claim 1, wherein the ferrous material is steel.

* * * * *